United States Patent
Anderson et al.

(10) Patent No.: US 12,135,261 B2
(45) Date of Patent: Nov. 5, 2024

(54) AUTOMATED TISSUE SECTION CAPTURE, INDEXING AND STORAGE SYSTEM AND METHODS

(71) Applicant: TissueVision, Inc., Somerville, MA (US)

(72) Inventors: Sean E. Anderson, Somerville, MA (US); Elijah Yew, Somerville, MA (US); Philip Knodle, Somerville, MA (US); Timothy Ragan, Somerville, MA (US)

(73) Assignee: TissueVision, Inc., Newton, MA (US)

( * ) Notice: Subject to any disclaimer, the term of this patent is extended or adjusted under 35 U.S.C. 154(b) by 1109 days.

(21) Appl. No.: 16/462,035

(22) PCT Filed: Nov. 17, 2017

(86) PCT No.: PCT/US2017/062428
§ 371 (c)(1),
(2) Date: May 17, 2019

(87) PCT Pub. No.: WO2018/094290
PCT Pub. Date: May 24, 2018

(65) Prior Publication Data
US 2019/0301980 A1  Oct. 3, 2019

Related U.S. Application Data

(60) Provisional application No. 62/424,270, filed on Nov. 18, 2016.

(51) Int. Cl.
*G01N 1/00*  (2006.01)
*G01N 1/06*  (2006.01)
(Continued)

(52) U.S. Cl.
CPC ......... *G01N 1/06* (2013.01); *G01N 35/00029* (2013.01); *G01N 35/00722* (2013.01);
(Continued)

(58) Field of Classification Search
CPC ............... G01N 1/06; G01N 35/00029; G01N 35/00722; G01N 35/0099; G01N 35/04;
(Continued)

(56) References Cited

U.S. PATENT DOCUMENTS 4,190,472 A * 2/1980 Slonicki ................. G01N 1/312
156/542
4,960,330 A   10/1990 Kerschmann
(Continued)

FOREIGN PATENT DOCUMENTS

CN  101395465 A   3/2009
CN  105842000 A   8/2016
(Continued)

OTHER PUBLICATIONS

Thorlabs, Galvanometer Mirror Systems Overview. Life Science Catalog. pp. 317-323, (2013).
(Continued)

*Primary Examiner* — Jyoti Nagpaul
(74) *Attorney, Agent, or Firm* — McCarter & English, LLP

(57) ABSTRACT

The present invention relates to systems and methods for transport and processing of sectioned biological samples. Preferred embodiments provide for use of a plurality of imaging and processing modalities to characterize sectioned tissue samples. Automated operation of the system provides for multimodal imaging and multistage processing to provide three-dimensional (3D) datasets for each sample.

20 Claims, 28 Drawing Sheets

(51) Int. Cl.
*G01N 35/00* (2006.01)
*G01N 35/04* (2006.01)

(52) U.S. Cl.
CPC ......... *G01N 35/0099* (2013.01); *G01N 35/04* (2013.01); *G01N 2001/061* (2013.01); *G01N 2035/00039* (2013.01); *G01N 2035/0091* (2013.01)

(58) Field of Classification Search
CPC ....... G01N 2001/061; G01N 2001/362; G01N 2035/00039; G01N 2035/0091
See application file for complete search history.

(56) References Cited

U.S. PATENT DOCUMENTS

| | | |
|---|---|---|
| 5,048,904 A | 9/1991 | Montagu |
| 5,109,149 A | 4/1992 | Leung |
| 5,139,338 A | 8/1992 | Pomerantz et al. |
| 5,156,019 A | 10/1992 | McCormick |
| 5,233,197 A | 8/1993 | Bowman et al. |
| 5,583,342 A | 12/1996 | Ichie |
| 5,633,695 A | 5/1997 | Feke et al. |
| 5,691,839 A | 11/1997 | Kobayashi |
| 5,700,346 A | 12/1997 | Edwards |
| 5,740,708 A | 4/1998 | Tabone |
| 5,783,814 A | 7/1998 | Fairley et al. |
| 6,020,591 A | 2/2000 | Harter et al. |
| 6,028,306 A | 2/2000 | Hayashi |
| 6,219,179 B1 | 4/2001 | Nielsen et al. |
| 6,248,988 B1 | 6/2001 | Krantz |
| 6,387,653 B1 | 5/2002 | Voneiff et al. |
| 6,392,795 B2 | 5/2002 | Okada |
| 6,423,960 B1 | 7/2002 | Engelhardt et al. |
| 6,449,039 B1 | 9/2002 | Bouzid |
| 6,496,267 B1 | 12/2002 | Takaoka |
| 6,603,537 B1 | 8/2003 | Dietz et al. |
| 6,623,977 B1 | 9/2003 | Farquharson et al. |
| 7,003,143 B1 | 2/2006 | Hewitt et al. |
| 7,009,699 B2 | 3/2006 | Wolleschensky et al. |
| 7,092,557 B2 | 8/2006 | Eisfeld et al. |
| 7,110,118 B2 | 9/2006 | Unlu et al. |
| 7,115,885 B2 | 10/2006 | Hell |
| 7,139,415 B2 | 11/2006 | Finkbeiner |
| 7,197,193 B2 | 3/2007 | Li et al. |
| 7,209,287 B2 | 4/2007 | Lauer |
| 7,215,469 B2 | 5/2007 | Nakata et al. |
| 7,217,573 B1 | 5/2007 | Oshida et al. |
| 7,274,446 B2 | 9/2007 | Wolleschensky et al. |
| 7,329,860 B2 | 2/2008 | Feng et al. |
| 7,366,394 B2 | 4/2008 | Takamatsu et al. |
| 7,372,985 B2 | 5/2008 | So et al. |
| 7,374,907 B1 | 5/2008 | Boneiff |
| 7,502,107 B2 | 3/2009 | Mohanty et al. |
| 7,561,326 B2 | 7/2009 | Funk et al. |
| 7,724,937 B2 | 5/2010 | So et al. |
| 7,749,754 B2 | 7/2010 | Sherwood et al. |
| 7,767,414 B1 | 8/2010 | Smith et al. |
| 7,772,985 B2 | 8/2010 | Kobayashi et al. |
| 7,863,585 B2 | 1/2011 | Hell et al. |
| 7,869,132 B2 | 1/2011 | Saito et al. |
| 7,966,091 B2 * | 6/2011 | Fujimoto ................ G01N 1/06 435/40.52 |
| 8,238,632 B2 | 8/2012 | Wilson et al. |
| 8,384,907 B2 | 2/2013 | Tearney et al. |
| 8,728,799 B2 | 5/2014 | Schmitt |
| 8,771,978 B2 | 7/2014 | Ragan |
| 8,839,700 B2 | 9/2014 | Chen et al. |
| 8,967,024 B2 | 3/2015 | Magavi et al. |
| 8,995,733 B2 | 3/2015 | Van Dijk et al. |
| 9,527,681 B2 | 12/2016 | Ito |
| 9,530,204 B2 | 12/2016 | Morimoto |
| 9,551,658 B2 | 1/2017 | Hell et al. |
| 9,719,928 B2 | 8/2017 | Hell |
| 9,901,295 B2 | 2/2018 | Iverson et al. |
| 9,983,134 B2 | 5/2018 | Ragan |
| 10,054,519 B2 | 8/2018 | Chen et al. |
| 10,197,476 B2 | 2/2019 | Gong et al. |
| 10,627,316 B2 | 4/2020 | Sawada |
| 2002/0190212 A1 | 12/2002 | Boas et al. |
| 2002/0191884 A1 | 12/2002 | Letant et al. |
| 2003/0132394 A1 | 7/2003 | Wolleschensky et al. |
| 2003/0223107 A1 | 12/2003 | Olszak et al. |
| 2004/0032650 A1 | 2/2004 | Lauer |
| 2004/0076319 A1 | 4/2004 | Fauver et al. |
| 2004/0110206 A1 | 6/2004 | Wong et al. |
| 2004/0125372 A1 | 7/2004 | Walla et al. |
| 2004/0228568 A1 | 11/2004 | Letant et al. |
| 2004/0257562 A1 | 12/2004 | Wachsmuth |
| 2004/0257646 A1 | 12/2004 | Wachsmuth |
| 2005/0024637 A1 | 2/2005 | Olschewski |
| 2005/0036667 A1 | 2/2005 | So et al. |
| 2005/0046836 A1 | 3/2005 | Olschewski |
| 2005/0046848 A1 | 3/2005 | Cromwell et al. |
| 2005/0259319 A1 | 11/2005 | Brooker |
| 2005/0260764 A1 | 11/2005 | Grigsby et al. |
| 2006/0012875 A1 | 1/2006 | Wolleschensky |
| 2006/0014287 A1 | 1/2006 | Sherwood et al. |
| 2006/0139637 A1 | 6/2006 | Cho et al. |
| 2006/0158655 A1 | 7/2006 | Everett et al. |
| 2006/0179992 A1 | 8/2006 | Kermani |
| 2006/0211752 A1 | 9/2006 | Kohn et al. |
| 2007/0038121 A1 | 2/2007 | Feldman et al. |
| 2007/0057211 A1 | 3/2007 | Bahlman et al. |
| 2007/0091428 A1 | 4/2007 | Wilson et al. |
| 2007/0229801 A1 | 10/2007 | Tearney et al. |
| 2007/0254280 A1 | 11/2007 | Lexow et al. |
| 2007/0258122 A1 | 11/2007 | Chamgoulov et al. |
| 2007/0260138 A1 | 11/2007 | Feldman et al. |
| 2008/0102006 A1 | 5/2008 | Kram et al. |
| 2008/0130093 A1 | 6/2008 | Silberberg et al. |
| 2008/0154128 A1 | 6/2008 | Milner |
| 2008/0192231 A1 | 8/2008 | Jureller et al. |
| 2009/0091566 A1 | 4/2009 | Turney et al. |
| 2009/0093709 A1 | 4/2009 | Patel et al. |
| 2009/0225399 A1 | 9/2009 | Zhao et al. |
| 2010/0000383 A1 | 1/2010 | Koos et al. |
| 2010/0028978 A1 | 2/2010 | Angros |
| 2010/0081190 A1 | 4/2010 | Hyde et al. |
| 2010/0081915 A1 | 4/2010 | Hyde et al. |
| 2010/0093022 A1 | 4/2010 | Hayworth et al. |
| 2010/0214404 A1 | 8/2010 | Chen et al. |
| 2010/0229702 A1 | 9/2010 | Fujimoto et al. |
| 2010/0265554 A1 | 10/2010 | Shirakura et al. |
| 2010/0294949 A1 | 11/2010 | Sasaki et al. |
| 2010/0323445 A1 | 12/2010 | Hayworth et al. |
| 2011/0058178 A1 | 3/2011 | Tearney et al. |
| 2011/0137126 A1 | 6/2011 | French et al. |
| 2011/0320174 A1 | 12/2011 | Ragan et al. |
| 2012/0163680 A1 | 6/2012 | Lefebvre |
| 2012/0208184 A1 | 8/2012 | Ragan |
| 2013/0010283 A1 | 1/2013 | Villiger et al. |
| 2013/0019725 A1 | 1/2013 | Magavi et al. |
| 2013/0045167 A1 | 2/2013 | Melles |
| 2013/0142413 A1 | 6/2013 | So et al. |
| 2013/0149734 A1 | 6/2013 | Ammar et al. |
| 2013/0203100 A1 | 8/2013 | Otter et al. |
| 2014/0041500 A1 * | 2/2014 | Isagawa .................. G01N 1/06 83/563 |
| 2014/0146376 A1 | 5/2014 | Kleppe et al. |
| 2014/0232848 A1 | 8/2014 | Schwedt et al. |
| 2014/0297199 A1 | 10/2014 | Osten |
| 2014/0356876 A1 | 12/2014 | Ragan |
| 2015/0008096 A1 | 1/2015 | Ito |
| 2015/0168276 A1 * | 6/2015 | Orfield .................... G01N 1/44 356/244 |
| 2015/0276563 A1 | 10/2015 | Carrigan et al. |
| 2015/0300924 A1 | 10/2015 | Miyatani et al. |
| 2016/0003715 A1 | 1/2016 | Torres et al. |
| 2016/0264973 A1 | 9/2016 | Aceto et al. |
| 2016/0290895 A1 * | 10/2016 | Daniel ............. G01N 35/00871 |
| 2016/0377546 A1 | 12/2016 | Ragan et al. |
| 2017/0199104 A1 | 7/2017 | Gradinaru et al. |
| 2018/0045623 A1 | 2/2018 | Ragan et al. |

(56) References Cited

U.S. PATENT DOCUMENTS

| | | |
|---|---|---|
| 2018/0202935 A1 | 7/2018 | Bahlman et al. |
| 2019/0064070 A1 | 2/2019 | Ragan |
| 2021/0325308 A1 | 10/2021 | Kannan et al. |
| 2023/0296484 A1 | 9/2023 | Ragan et al. |

FOREIGN PATENT DOCUMENTS

| | | |
|---|---|---|
| EP | 1580586 A1 | 9/2005 |
| EP | 2249194 A1 | 11/2010 |
| JP | H06-323967 A | 11/1994 |
| JP | 2000-193889 A | 7/2000 |
| JP | 2001-235401 A | 8/2001 |
| JP | 2001-249124 A | 9/2001 |
| JP | 2004-028965 A | 1/2004 |
| JP | 2005-017127 A | 1/2005 |
| JP | 2005-508489 A | 3/2005 |
| JP | 2005-275206 A | 10/2005 |
| JP | 2006-010620 A | 1/2006 |
| JP | 2006-031004 A | 2/2006 |
| JP | 2006-178472 A | 7/2006 |
| JP | 2007-057255 A | 3/2007 |
| JP | 2007-187603 A | 7/2007 |
| JP | 2007-212388 A | 8/2007 |
| JP | 2008-076251 A | 4/2008 |
| JP | 2008-164521 A | 7/2008 |
| JP | 2008-197127 A | 8/2008 |
| JP | 2009-517662 A | 4/2009 |
| JP | 2009-150864 A | 7/2009 |
| JP | 2010-008989 A | 1/2010 |
| JP | 2010-532878 A | 10/2010 |
| JP | 2010-250191 A | 11/2010 |
| JP | 2010-271569 A | 12/2010 |
| JP | 2011-527218 A | 10/2011 |
| JP | 2012-229994 A | 11/2012 |
| JP | 2013-045078 A | 3/2013 |
| JP | 2013-113689 A | 6/2013 |
| JP | 2013-160718 A | 8/2013 |
| JP | 2016-191708 A | 11/2016 |
| SU | 426146 A1 | 4/1974 |
| SU | 426164 A1 | 4/1974 |
| WO | 1998/02851 A1 | 1/1998 |
| WO | 2000/42417 A1 | 7/2000 |
| WO | 2001/40769 A2 | 6/2001 |
| WO | 2001/42796 A1 | 6/2001 |
| WO | 2002/084265 A1 | 10/2002 |
| WO | 2006/127967 A2 | 11/2006 |
| WO | 2006/135769 A1 | 12/2006 |
| WO | 2007/099382 A1 | 9/2007 |
| WO | 2007/149971 A2 | 12/2007 |
| WO | 2010/045400 A3 | 7/2010 |
| WO | 2011/163484 A2 | 12/2011 |
| WO | 2012/068142 A2 | 5/2012 |
| WO | 2012/069076 A1 | 5/2012 |
| WO | 2012/172024 A1 | 12/2012 |
| WO | 2013/045078 A1 | 4/2013 |
| WO | 2013/126762 A1 | 8/2013 |
| WO | 2014/202998 A1 | 12/2014 |
| WO | 2015/046518 A1 | 4/2015 |
| WO | 2015/100421 A1 | 7/2015 |
| WO | 2016/145366 A8 | 10/2016 |
| WO | 2016/163385 A1 | 10/2016 |
| WO | 2018/094290 A1 | 5/2018 |

OTHER PUBLICATIONS

Allen, Bringing CLARITY to the study of the brain. Retrieved online at: http://membercentral.aaas.org/blogs/qualia/bringing-clarity-study-brain. 3 pages. Mar. 11, 2013.

Andresen et al., Time-multiplexed multifocal multiphoton microscope. Opt Lett. Jan. 15, 2001;26(2):75-7.

Augustinack et al., MRI parcellation of ex vivo medial temporal lobe. NeuroImage. Article in Press, May 2013, 8 pages.

Bewersdorf et al., Multifocal multiphoton microscopy. Opt Lett. May 1998;23(9):655-7.

Bird et al., Fibre-optic two-photon scanning fluorescence microscopy. J Microsc. Oct. 2002;208(Pt 1):35-48.

Bird et al., Two-photon fluorescence endoscopy with a micro-optic scanning head. Opt Lett. Sep. 1, 2003;28(17):1552-4.

Buist et al., Real time two-photon absorption microscopy using multi point excitation. Journal of Microscopy. Nov. 1998;192(2):217-226.

Cambridge Technology, Inc., Model 6240H Galvanometer Optical Scanner, Instruction Manual. www.cambridgetechnology.com. 22 pages, Sep. 23, 2004.

Chasles et al., Optimization and characterization of a structured illumination microscope. Opt Express. Nov. 26, 2007;15(24):16130-40.

Denk et al., Two-photon Laser Scanning fluorescence microscopy. Science. Apr. 6, 1990;248:73-76.

Dubois et al., High-resolution full-field optical coherence tomography with a Linnik microscope. Appl Opt. Feb. 1, 2002;41(4):805-12.

Ducros et al., Efficient large core fiber-based detection for multichannel two-photon fluorescence microscopy and spectral unmixing. J Neurosci Methods. Jun. 15, 2011;198(2):172-80.

Goldman, Lightning strikes twice: Optogenetics pioneer Karl Deisseroth's newest technique renders tissues transparent, yet structurally intact. Scope, Stanford Medicine. Retrieved online at: http://scopeblog.stanford.edu/2013/04/10/lightning-strikes-twice-optogenetics-pioneer-karl-deisseroths-newest-technique-renders-tissues-transparent-yet-structurally-intact/ 2 pages. Apr. 10, 2013.

Helmchen et al., A miniature head-mounted two-photon microscope: High-resolution brain imaging in freely moving animals. Neuron. Sep. 27, 2001;31(6):903-12.

Helmchen et al., Enhanced two-photon excitation through optical fiber by single-mode propagation in a large core. Appl Opt. May 20, 2002;41(15):2930-4.

Hillman et al., Depth-resolved optical imaging and microscopy of vascular compartment dynamics during somatosensory stimulation. Neuroimage. Mar. 2007;35(1):89-104.

Jeong et al., Combined two-photon microscopy and optical coherence tomography using individually optimized sources. Opt Express. Jul. 4, 2011;19(14):13089-96.

Jung et al., Multiphoton endoscopy. Opt Lett. Jun. 1, 2003;28(11):902-4.

Kim et al., High speed handheld multiphoton multifoci microscopy. Proc. SPIE Int. Soc. Opt. Eng.; Progress in Biomedical Optics and Imaging—Multiphoton microscopy in the Biomedical Sciences IV. Jun. 2004;5353:267-272.

Kim et al., Multifocal multiphoton microscopy based on multianode photomultiplier tubes. Optics Express. Sep. 3, 2007;15(18):11658-11678.

Kim et al., Optical biopsy in high-speed handheld miniturized multifocal multiphoton microscopy. Progr. Biomed. Opt. Imaging Proc. SPIE: Multiphoton Microscopy in the Biomedical Sciences V. Mar. 2005; 5700:14-22.

Kim et al., Usage of multi anode PMT on the multi-photon fluorescence spectroscopy and video rate microscopy. 24th Annual Conference and the Annual Fall Meeting of the Biomedical Engineering Society EMBS/BMES Conference. Proceedings of the Second Joint Engineering in Medicine and Biology, p. 1206. 2002.

Leveque-Fort et al., Fluorescence lifetime imaging with multifocal two-photon microscope. Proceedings of SPIE—The International Society for Optical Engineering. Jun. 2004;5323(1):99-107.

Leveque-Fort et al., Time-resolved multifocal multiphoton microscopy. Proceedings of SPIE—The International Society for Optical Engineering. Jun. 2003;5139:173-179.

Lim et al., Wide-field fluorescence sectioning with hybrid speckle and uniform-illumination microscopy. Opt Lett. Aug. 15, 2008;33(16):1819-21.

Makhlouf et al., A dual modality fluorescence confocal and optical coherence tomography microendoscope. Endoscopic Microscopy V. Guillermo J. Tearney (Ed.), Proceedings of SPIE BiOS. Feb. 24, 2010;7558:75580K-1-75580K-8.

(56) References Cited

OTHER PUBLICATIONS

Nielsen et al., High efficiency beam splitter for multifocal multiphoton microscopy. J Microsc. Mar. 2001;201(Pt 3):368-76.

Osten, CSHL team introduces automated imaging to greatly speed whole-brain mapping efforts. Cold Spring Harbor, N.Y. 4 pages, Jan. 12, 2012.

Qin et al., 1D-Scanning Adressable Multiregional Multifocal Multiphoton Microscopy. Ultrafast Imaging and Spectroscopy. Proceedings of SPIE. Sep. 28, 2013;8845:884517. 9 pages.

Ragan et al., Serial two-photon tomography: an automated method for ex-vivo mouse brain imaging. Nat Methods. Sep. 1, 2012;9(3):255-258.

Reyssat et al., Slicing softly with shear. Phys Rev Lett. Dec. 14, 2012;109(24):244301, 5 pages.

Sacconi et al., Microphoton multifocal microscopy exploiting a diffractive optical element. Opt Lett. Oct. 15, 2003;28(20):1918-20.

Shao et al., Multifocal multiphoton microscopy based on a spatial light modulator. Appl Phys B. Jun. 2013;107(3):653-657.

So et al., High-throughput nonlinear optical microscopy. Biophys J. Dec. 17, 2013;105(12):2641-54.

Tang et al., Combined multiphoton microscopy and optical coherence tomography using a 12-fs broadband source. J Biomed Opt. Mar.-Apr. 2006;11(2):020502. 3 pages.

Wang et al., Reconstructing micrometer-scale fiber pathways in the brain: multi-contrast optical coherence tomography based tractography. Neuroimage. Oct. 15, 2011;58(4):984-92.

Webb et al., A wide-field time-domain fluorescence lifetime imaging microscope with optical sectioning. American Institute of Physics, Review of Scientific Instruments. Mar. 2002;5139:1898-1907.

European Office Action for Application No. 11790823.6, dated Sep. 19, 2018, 8 pages.

International Preliminary Report on Patentability for Application No. PCT/EP2011/066246, dated Mar. 28, 2013. 10 pages.

International Preliminary Report on Patentability for Application No. PCT/US2014/072368, dated Jun. 28, 2016, 9 pages.

International Search Report and Written Opinion for Application No. PCT/US2017/062428, dated Apr. 12, 2018, 14 pages.

International Search Report for Application No. PCT/EP2011/066246, dated Jan. 23, 2012. 5 pages.

International Search Report for Application No. PCT/US2011/060831, dated Jul. 17, 2012. 7 pages.

International Search Report for Application No. PCT/US2016/022106, dated Jun. 17, 2016. 3 pages.

Japanese Office Action for Application No. 2016-543202, dated Dec. 26, 2018. 11 pages.

Bewersdorf et al., Multifocal Multi-Photon Microscopy. Handbook of Biological Confocal Microscopy, Third Edition. James H. Pawley (Ed.). Springer Science+Business Media, LLC. pp. 550-551, (2006).

Cha et al., Non-descanned multifocal multiphoton microscopy with a multianode photomultiplier tube. AIP Advances. 2015;5:084802, 14 pages.

Economo et al., A platform for brain-wide imaging and reconstruction of individual neurons. Elife. Jan. 20, 2016;5:e10566, 34 pages.

Engelbrecht et al., Miniaturized selective plane illumination microscopy for high-contrast in vivo fluorescence imaging. Opt Lett. May 1, 2010;35(9):1413-5.

Helmchen et al., Miniaturization of two-photon microscopy for imaging in freely moving animals. Cold Spring Harb Protoc. Oct. 1, 2013;2013(10):904-13.

Helmchen, Miniaturization of fluorescence microscopes using fibre optics. Exp Physiol. Nov. 2002;87(6):737-45.

Kim et al., High-speed, two-photon scanning microscope. Appl Opt. Oct. 1, 1999;38(28):6004-9.

Kim et al., Three-Dimensional Image Cytometer Based on a High-Speed Two-Photon Scanning Microscope. Proc SPIE. Apr. 2001,4262:238-46.

Konig, Multiphoton microscopy in life sciences. J Microsc. Nov. 2000;200(Pt 2):83-104.

Moneron et al., Two-photon excitation STED microscopy. Optics Express. Aug. 17, 2009;17(17):14567-14573.

So et al., Two-Photon Excitation Fluorescence Microscopy. Annu Rev Biomed Eng. Aug. 2000;20:399-429.

U.S. Appl. No. 11/442,702, filed May 25, 2006, 2007-0057211, Abandoned.

U.S. Appl. No. 15/515,536, filed Nov. 16, 2017, U.S. Pat. No. 10,598,597, Issued.

U.S. Appl. No. 13/297,035, filed Nov. 15, 2011, U.S. Pat. No. 8,771,978, Issued.

U.S. Appl. No. 14/300,425, filed Jun. 10, 2014, U.S. Pat. No. 9,983,134, Issued.

U.S. Appl. No. 15/989,886, filed May 25, 2018, U.S. Pat. No. 10,908,087, Issued.

U.S. Appl. No. 15/192,345, filed Jun. 24, 2016, 2016-0377546, Published.

U.S. Appl. No. 15/556,862, filed Sep. 8, 2017, U.S. Pat. No. 10,788,403, Issued.

U.S. Appl. No. 17/035,040, filed Sep. 28, 2020, 2021-0199545, Published.

U.S. Appl. No. 15/515,536, filed Nov. 16, 2017, 2018-0202935, Published.

U.S. Appl. No. 15/989,886, filed May 25, 2018, 2019-0064070, Published.

U.S. Appl. No. 15/556,862, filed Sep. 8, 2017, 2018-0045623, Published.

Matsumoto et al., Modulation of the pupil function of a microscope objective lens for multifocal multi-photon microscopy using a spatial light modulator. Proc SPIE. Feb. 28, 2014;8948:89481Q-1-89481Q-8.

\* cited by examiner

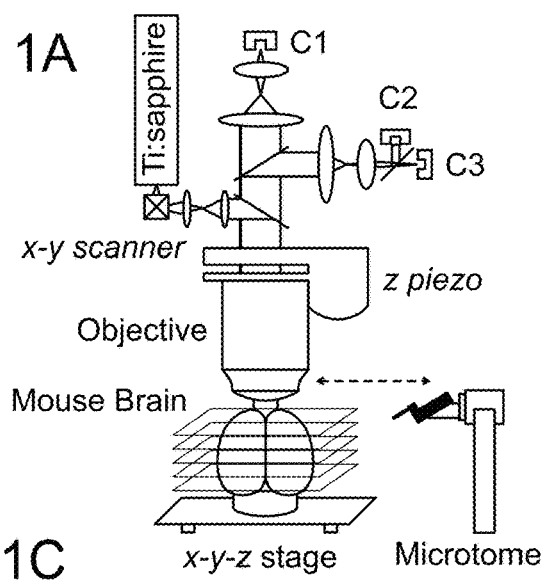
FIG. 1A
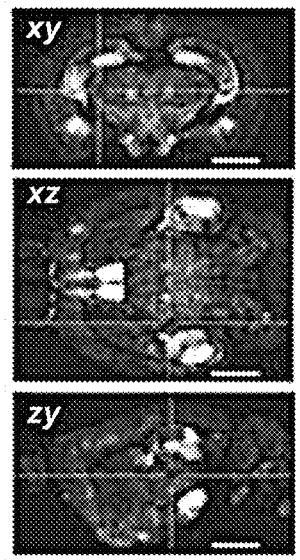
FIG. 1B
FIG. 1C
FIG. 1D  FIG. 1E

FIG. 6A
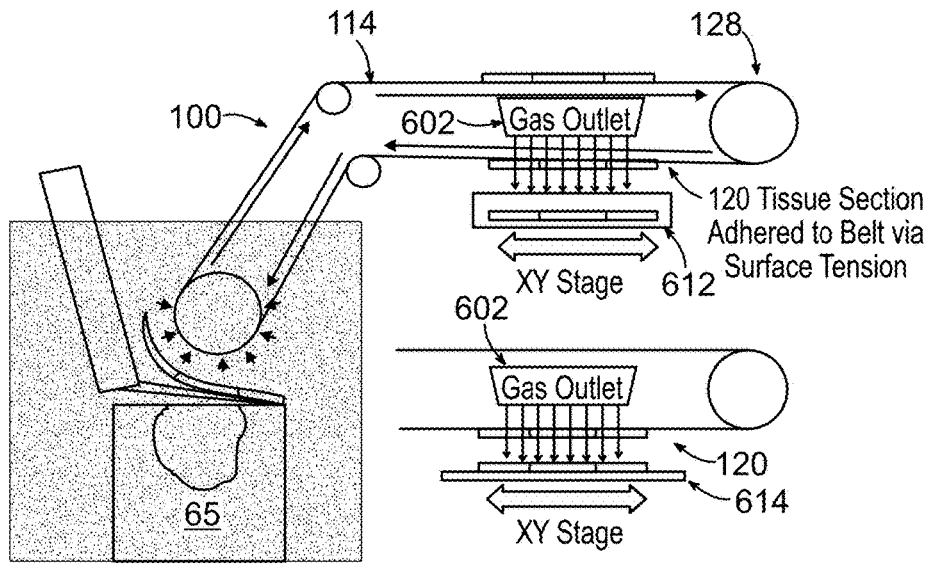
FIG. 6B
FIG. 6C
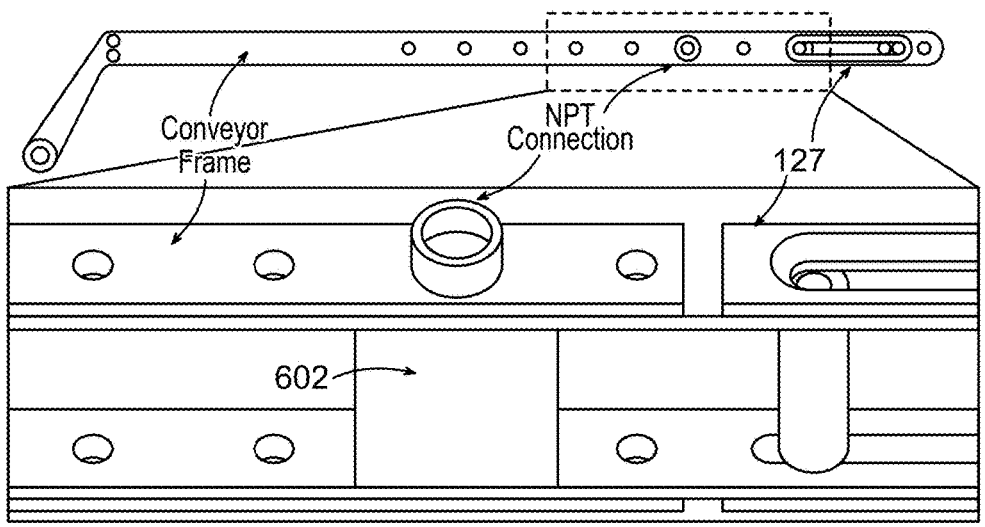
FIG. 6D
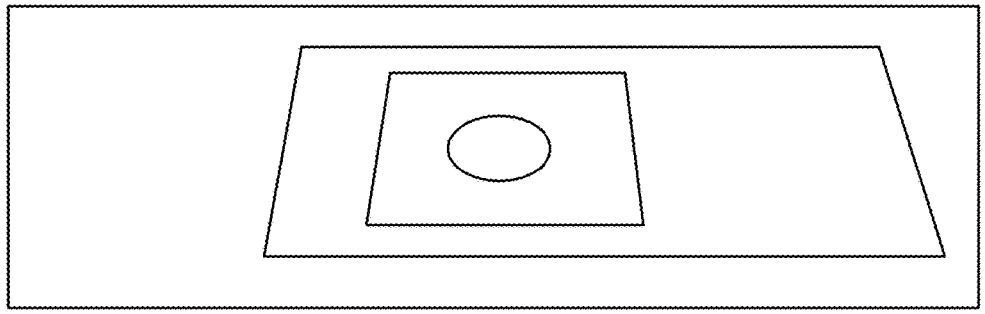

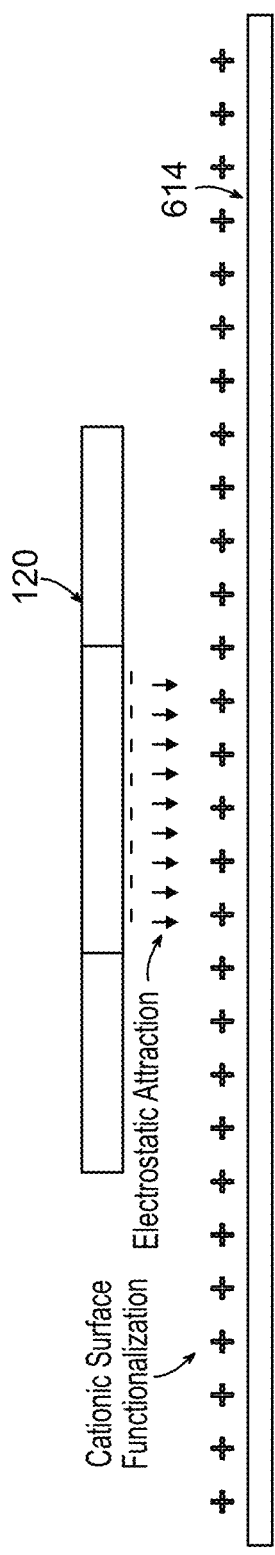
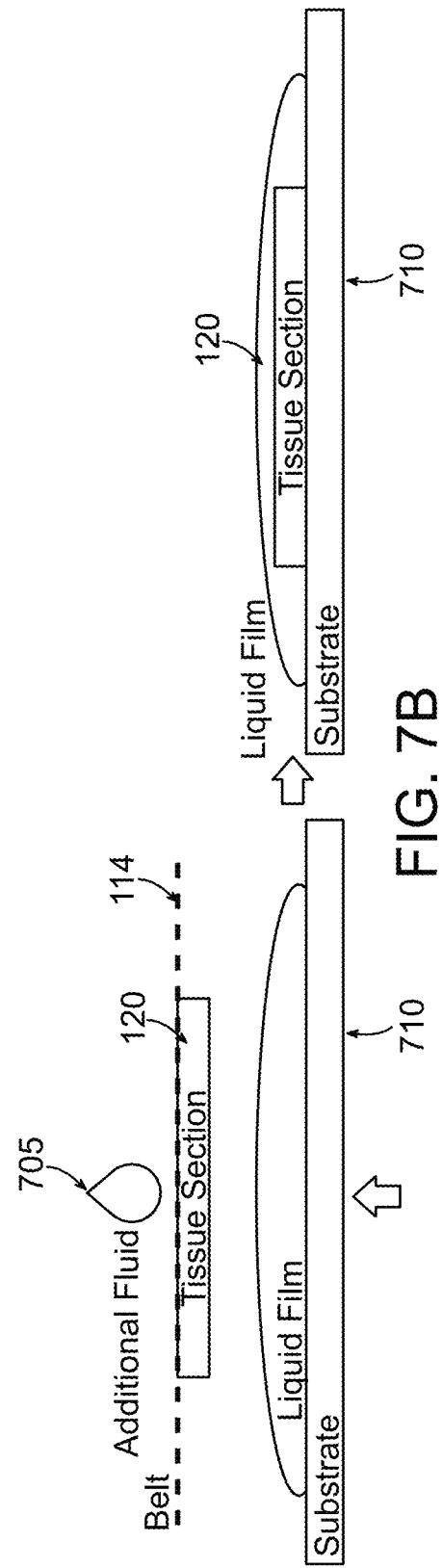
FIG. 7A
FIG. 7B

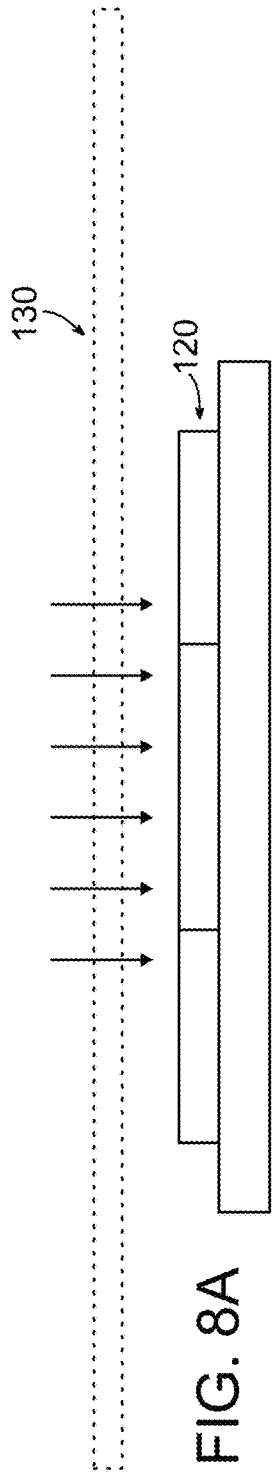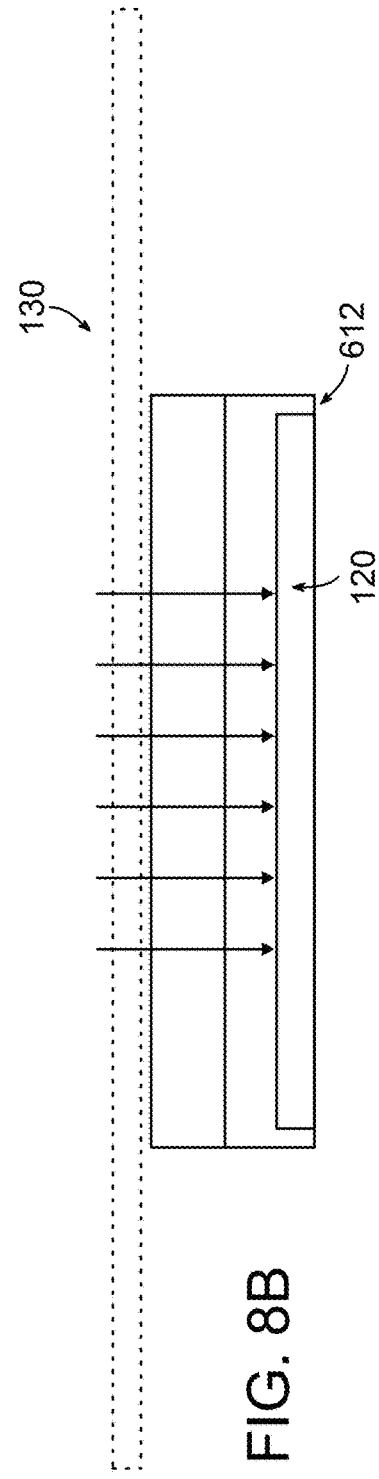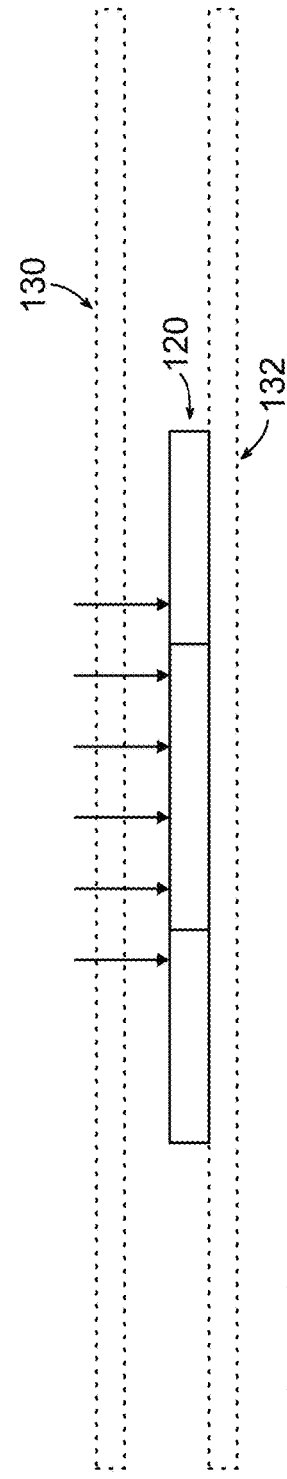

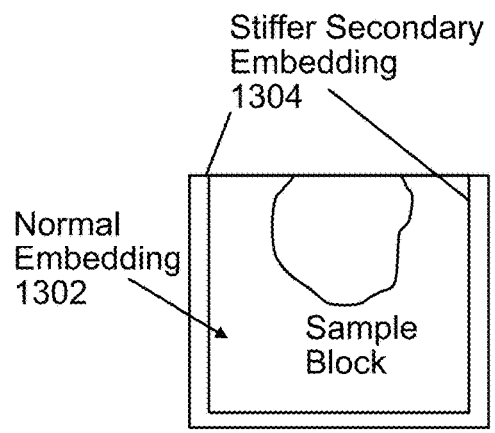
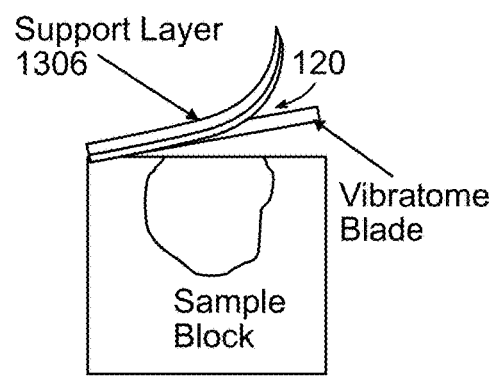
FIG. 13A  FIG. 13B
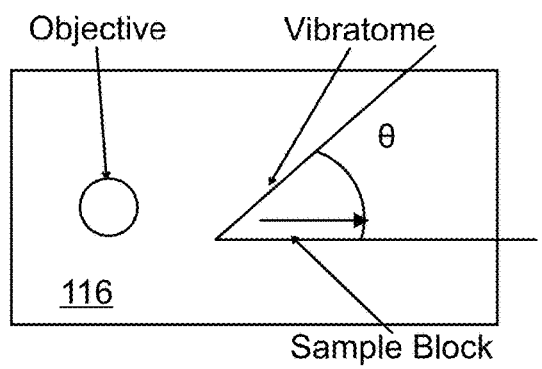
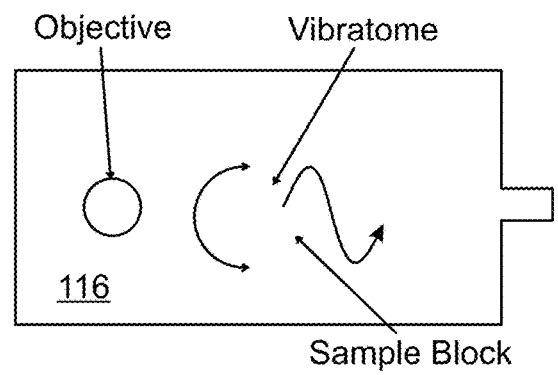
FIG. 13C  FIG. 13D

AUTOMATED TISSUE SECTION CAPTURE, INDEXING AND STORAGE SYSTEM AND METHODS

CROSS REFERENCE TO RELATED APPLICATIONS

This application is a 35 U.S.C. § 371 national stage filing of International Application No. PCT/US2017/062428, filed on Nov. 17, 2017, which claims priority to U.S. Provisional Application No. 62/424,270, filed Nov. 18, 2016, the entire contents of the above applications being incorporated herein by reference in their entireties.

BACKGROUND OF THE INVENTION

Tissue sections are used in a wide array of histology and pathology assays because they facilitate staining, labeling and imaging of the tissue, which often cannot be performed directly on a thick sample. The sectioning process involves embedding of the tissue in a support material such as a wax, resin, ice, or gel, and then thinly slicing it using a microtome or vibrating blade microtome to a thickness on the order of microns to hundreds of microns. The difference between a microtome and a vibrating blade microtome is that a vibrating blade microtome uses a vibrating blade submerged in fluid which allows it to controllably section softer materials, such as tissues and gels. Microtomes typically require harder embedding media that infiltrates the tissue, and can require significant post-processing to remove the infiltrated wax/resin. This post-processing can affect the sample and interfere with secondary assays. After sectioning, the collection, handling, storage, and mounting of tissue sections needs to be performed manually by an experienced technician, even in commercial automated systems. This is tedious and costly in terms of labor and throughput, and many steps of the process are subject to human error. There is a demand for a robust system for automated sectioning and storage of tissue sections to reduce cost and to improve the throughput and consistency of histology assays. These capabilities would also facilitate integration with existing and novel automated laboratory systems. One technology that provides automated capture and imaging of tissue sections is serial two-photon tomography (STPT).

STPT can quickly ex vivo image thick tissue samples with sub-micron resolution even across entire organs such as a mouse brain. Advanced molecular histology assays can annotate tissue slices with rich molecular information. However, no current techniques can produce molecularly-annotated 3D maps of thick tissues and whole organs. STPT lacks the necessary multiplexed biochemical specificity and is generally limited to light microscopy approaches, while most molecular assays lack the requisite throughput and 3D spatial extent. As such, there still exists a crucial gap in understanding the structure and composition of thick tissues and whole organs. Without such an understanding it is difficult, if not impossible, to develop effective therapeutics for many diseases and disorders.

There have been few successful efforts in histopathology to automate the tissue sectioning and storage process. While "automated" microtomes exist commercially, they tend to imply only semi-automated or assisted sectioning processes and have no capabilities for automated collection and handling of the tissue sections. These devices still require an experienced technician to manipulate and collect the slices manually or semi-manually.

Previous systems that perform automated microtomy are not compatible with soft samples and are usually not compatible with imaging between sectioning. These systems were designed with different specific target applications in mind. For example, one system sections paraffin-embedded samples with a microtome and outputs prepared slides for slide-scanning applications. Another system produces thin ultramicrotome sections of resin-embedded samples (typically *C. Elegans*) for serial electron microscopy. Its sample output feeds into a custom electron microscope sample holder.

Methods have been developed to capture agarose tissue sections using a six-axis robotic arm in a pick-and-place configuration. For instance, International Patent Application No. PCT/GB2014/051899 by Troy et al. (International Patent Publication WO 2014/202998), the entire contents of which is incorporated herein by reference, describes a system where the arm lowers an end effector into the bath solution, applies suction to adhere the slice to suction cups on its end effector, and then lifts the slice out of solution and deposits it in a receptacle while dispensing buffer solution. The receptacle is then loaded into a rotary carousel for storage. Cost and complexity aside, this system likely suffers from reliability issues, in particular with thinner sections, as it would not handle conformational differences among tissue slices very well, and has poor conformational control over the deposited slice. As researchers move towards thinner sections, it will be necessary to gently capture slices onto a support substrate for handling, as direct handling will damage thinner sections.

BRIEF SUMMARY OF THE INVENTION

This invention relates to the field of automated histopathology, in particular automated methods for the study of biological tissue samples or the pathology of diseases and disorders in those tissues. This can include the processing, handling, and execution of a variety of methodologies on tissue sample(s) of interest.

In preferred embodiments of the present invention, multiple modalities are described for automated capture, indexing, and storage of histological tissue sections produced by a vibrating blade microtome technology to improve vibrating blade sectioning, and multiple applications of these technologies. The mechanism for capturing tissue sections applies a force to move the tissue sections or slices onto a transfer material, plate, or slide, for example. A preferred method provides an attractive force to pull a tissue slice into contact with a support substrate or pallet as the tissue slice is being sectioned from the sample block in a water bath. The substrate and the attractive force serve to guide the conformation and motion of the tissue slice such that it can be transported out of the water bath and into storage. Once out of the water bath, surface tension between the wetted tissue section and the support substrate can be used to keep the slices robustly adhered to the surface during transport without loss of conformation. Surface treatments can also be used to promote slice adhesion.

Slices can be detached from the support substrate using a fluid inertial force to overcome the adhesive surface tension force for the controllable transfer into storage or other handling systems and modalities. The slices are stored in wells or tubes, on substrates, or in some other container, with or without buffer solution depending on the application. Sections can also be stored sequentially on a film reel, or enveloped in a thin film for further automated processes. Indexing is accomplished in the control software; storage coordinates can be loaded into the software to specify how and where the slices are stored, and a metadata file tracks the physical location of each slice. The system configurations are designed for full-compatibility with many imaging modalities including serial two-photon tomography (STPT), a method for 3D tissue imaging, in order to enable the physical tissue section to be tracked relative to its 3D imaging data from STPT. In other embodiments of the invention, other imaging block face and whole specimen modalities can be used. Multiple wavelengths can be detected by a corresponding plurality of detector elements. A data processor can be used to process the spectral data generated by the detectors.

Other imaging technologies beyond STPT that will benefit from automated sectioning and collections of slices include coherent anti-Raman Stokes imaging (CARS), Stimulated Raman Scattering (SRS), Optical Coherence Tomography (OCT), Oblique Light Sheet, Light Sheet Theta Microscopy, Inverted Light Sheet Microscopy, Swept confocally-aligned planar excitation (SCAPE), selective plane illumination microscopy (SPIM), confocal Raman, confocal, spinning disk confocal, block face structured illumination, block face imaging, and optical frequency domain imaging (OFDI). In preferred embodiments, these imaging modalities are combined with physical sectioning of the tissue.

Other methods such as magnetic resonance imaging (MRI), positron emission tomography0 (PET), Optical projection Tomography (OPT) and ultrasound can be used in other embodiments, as these methods can be used to produce a 3D volume of a specimen such as a tissue (including plant tissue), organ or whole animal. In some embodiments of this invention, the specimen can be cleared by various methods (CLARITY, CUBIC, ScaleS, Sacel, 3Disco, UDisco) or labeled by whole mount procedures, iDisco for instance, or by various methods to label whole animals and organs, such as intravita labeling. The imaged specimen can then be sectioned, and the recovered sections can be analyzed by various methods, both optical and biochemical, and the information obtained from these analyses on the sections can then be aligned and registered back to the original 3D volume.

Thus, the present system removes a key barrier to obtaining 3D molecular maps by enabling an automated tissue capture device to be integrated into both 2D and 3D imaging equipment. In particular, serial blockface imaging techniques can alternate optical imaging and mechanical sectioning to construct 3D datasets of macroscopic samples. The uppermost portion of the tissue is imaged to a depth of tens of microns, for example, and then removed with a vibrating blade microtome or other sectioning device. The process then repeats until the entire tissue has been imaged. Currently, tissue sections that are generated are randomly distributed within the buffer bath and need to be manually collected, sorted, and mounted individually for secondary assays. This approach is impractical for large numbers of delicate sections. Further, thin tissue sections tend to roll and fold upon themselves making them difficult to handle. The system described in this application automatically captures tissue slices while maintaining their orientation and storing them for downstream analysis. The resulting in-depth molecular information obtained from these analyses can then be mapped back onto the high resolution 3D dataset to construct 3D molecular maps of tissue and whole organs. These secondary assays can be specifically targeted to specific regions of interest, performed on a subset of samples, for example, every Nth section, or performed on an entire sample for more exploratory assays. These secondary assays need not be known a priori and can be performed in response to the results of future assays.

BRIEF DESCRIPTION OF THE DRAWINGS

FIGS. 1A-1E depict serial two-photon tomography of a mouse brain. FIG. 1A depicts an example device setup. FIG. 1B depicts coronal (top), horizontal (mid), and saggital (bottom) views of a mouse brain after 3D reconstruction with 2 mm scale bars. FIG. 1C depicts a 3D view of a coronal section. FIGS. 1D and 1E depict enlarged areas of regions marked in FIG. 1C, showing dendritic spines (1D) and axon fibers (1E). Scale bars are 25 µm in FIGS. 1D and 1E and 5 µm in the inset of FIG. 1D.

FIG. 2A shows a schematic side view. During sectioning, the tissue slice is attracted to the conveyor's capstan inlet manifold (CIM) via suction. The slice is drawn into conformal contact with the conveyor belt, and is then transported out of solution where surface tension adheres it to the belt. FIG. 2B depicts a 3D CAD model of a preliminary conveyor frame design. The inset of FIG. 2B shows an enlarged view of CIM with NPT-thread fluid coupling. Holes are sized and spaced to attain approximately uniform flow along its length.

In FIG. 4A, a porous or perforated thin film is passed around the capstan inlet manifold (CIM) in a reel-to-reel arrangement. Suction is applied to the manifold header to draw fluid through the thin film to apply an attractive suction or fluid drag force to the tissue slice during sectioning. The red box indicates the region shown in FIG. 4B. FIG. 4B depicts a storage concept in which the tissue section is punched out of the thin film using an automated die cutter. The punched tissue section on the thin film substrate is deposited into a well array with buffer solution.

FIG. 4E illustrates the first section capture system working in concert with a second capture system.

FIGS. 6A-6D depict a tissue section detachment mechanism to transfer slices from the conveyor belt to another object. FIG. 6A depicts a schematic side view of the mechanism. A jet of compressed inert gas is applied to the tissue section from the backside of the conveyor belt as it is in an inverted orientation. The fluid inertial force and gravity are sufficient to overcome the adhesive surface tension force and allow the slice to be transferred to an adjacent substrate. FIG. 6B depicts a CAD model side view with a detachment region outlined in the dashed box. FIG. 6C illustrates an expanded orthographic view of the detachment region outlined in the dashed box of FIG. 6B showing a gas outlet with NPT coupling. The outlet is designed to direct flow from the NPT coupling downwards through the belt and onto the tissue section. FIG. 6D depicts a 100 µm mouse brain coronal tissue section transferred to a treated glass microscope slide.

FIG. 7A depicts electrostatic adhesion of a tissue section to a functionalized substrate. The substrate is shown in green and functionalized with a cationic surface treatment to give it a positive charge which attracts the native negative charge of the tissue.

FIG. 7B depicts a fluid flow system to transfer tissue sections in accordance with various embodiments of the present application.

FIGS. 8A-8C depict various tissue section storage configurations upon tissue section detachment via the gas jet. FIG. 8A depicts a tissue section detached onto a substrate, such as a microscope slide, shown in green. FIG. 8B depicts the tissue section detached into a well with buffer solution. FIG. 8C depicts the tissue section detached onto another conveyor, film, or tape.

FIG. 9A depicts well-plate storage. The tissue sections are deposited onto slide arrays (not depicted) or into well-plates (pictured) on the xy stage. When the plate/array is full, a gantry robot transfers it to a storage rack on a motorized carousel, and then transfers a fresh plate/array from the rack to the xy stage. When a rack is full, the carousel rotates the next rack into position. FIG. 9B depicts an individual slide storage system. Sections can be transferred to individual slides on a carousel. A gantry robot transfers tissue sections on slides from a single pickup location to a storage rack and then replaces a fresh slide on the carousel from a supply rack.

FIG. 10A depicts a schematic side view of a storage concept. A flighted conveyor belt catches slides from a dispenser to load them onto the belt. The tissue section can be transferred from the section capture conveyor onto individual slides. A robotic end effector with a suction lift (pictured) or mechanical gripper can place the slide into a storage rack. FIG. 10B depicts a schematic top view of the system in FIG. 10A.

FIGS. 13A-13D depict improved sectioning techniques. FIG. 13A depicts a sample block embedded in secondary, stiffer material that can be sectioned. This secondary material provides additional support to the block during sectioning. FIG. 13B depicts the use of a support material during sectioning. For thin sections, a support material can be added to the top of the block and sectioned, effectively cutting a thicker section. This support material can then be removed. FIG. 13C depicts vibrating blade microtome sectioning at an angle, θ, to add an additional transverse velocity component to the cut. Sample motion is indicated by red arrow. FIG. 13D depicts motion of the sample block in addition to the normal vibrating blade microtome sectioning. Sample trajectories are shown in red to indicate rotary or sinusoidal motion of the block. This motion also adds additional transverse velocity to the cut.

DETAILED DESCRIPTION OF THE INVENTION

Preferred embodiments of the present invention can comprise four central elements: (1) A vibrating blade microtome that can cut thin (10-1,000 micron) sections from a tissue embedded in a tissue block, for example, an agar block. (2) An inlet manifold through which the buffer solution can be drawn by an attached pump and recirculated into the buffer bath. This manifold is positioned near the vibrating blade microtome, which is also known as a vibratome, and the intake of buffer produces a fluidic force which attracts the tissue section. (3) A transfer material such as a porous conveyer belt, tape or flexible material upon which the samples are transported is driven around the inlet manifold. The manifold acts like a pulley to redirect the transport material or belt motion. The belt slides over the manifold surface and transports the tissue section out of the buffer (FIG. 2A) where it adheres strongly to the belt by surface tension. (4) A collection station where the tissue sections are deposited (e.g., FIG. 4B). This design has several beneficial aspects. The tissue section is gently and controllably drawn to the sample transport device or conveyor while it is sectioned, providing consistency in the section's position and orientation. Pulling the tissue slice into good contact with the tape or belt surface prevents conformational variability due to curling or folding and helps preserve the integrity of the tissue slice by providing uniform support. As it is being transported out of the buffer, surface tension forces keep the slice positioned on the belt with a flat conformation. Lastly, the system is mechanically simple, has a wide degree of flexibility in positioning the components, and is driven by a simple rotational motion, which saves cost and complexity when compared to alternative options such as multi-axis robots. The system is designed for full compatibility with STPT and other imaging approaches but can be used independently for general histopathology applications or in a similar configuration with whole organ or organism imaging modalities. Additional details regarding sectioning, imaging and processing of tissue samples can be found in U.S. Pat. No. 8,771,978, the entire contents of which is incorporated herein by reference.

FIGS. 1A-1E depict an example of serial two-photon tomography of a mouse brain. FIG. 1A depicts an example device setup. FIG. 1B depicts coronal (top), horizontal (mid), and saggital (bottom) views of a mouse brain after 3D reconstruction with 2 mm scale bars. FIG. 1C depicts a 3D view of a coronal section. FIGS. 1D and 1E depict enlarged areas of regions marked in FIG. 1C, showing dendritic spines (1D) and axon fibers (1E). Scale bars are 25 µm in FIGS. 1D and 1E and 5 µm in the inset of FIG. 1D.

Figure 1F:
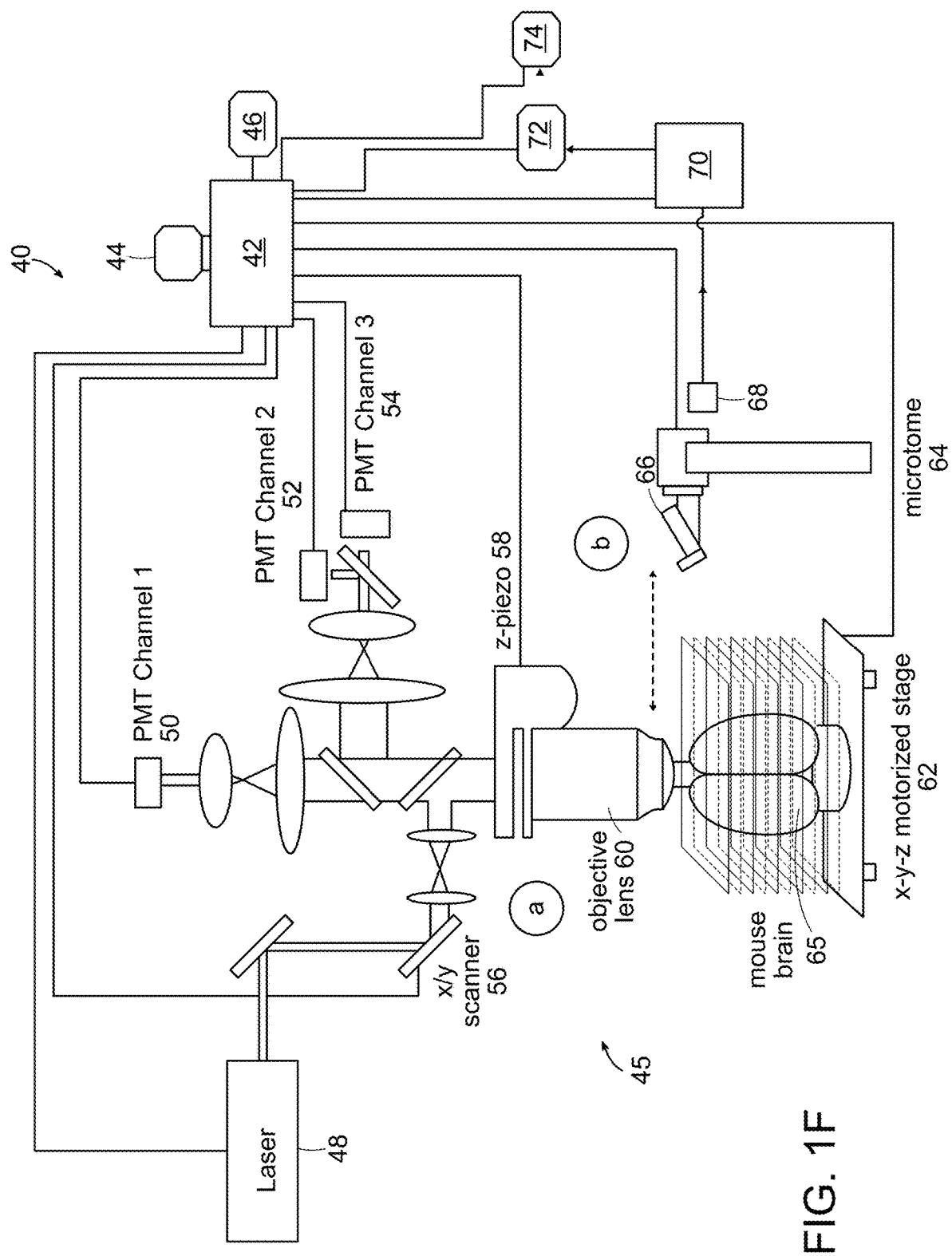
FIG. 1F depicts a data processing and control system for preferred embodiments of the invention.

FIG. 1F depicts an imaging and processing system 40 in accordance with the invention. A processor 42 is connected to system components including light source 48, a first PMT channel 50, second PMT channel 52, third PMT channel 54, (x,y) scanner 56, vertical scanner 58 that translates objective lens 60 relative to the tissue sample 65 (such as a whole organ mouse brain), sample motorized stage 62, microtome 64 with cutting tool 66, tissue section transport system 68 which moves each section of tissue to a storage system 70, a processing system 72 that further processes the section and a second imaging system 74 that can be used in combination with the first imaging system 45 to generate images of processed tissue. The images of the tissue, both before and after sectioning, can be stored in memory 46 and displayed in various formats as described herein on display 44. Additional details regarding imaging systems and methods of using these systems are described in U.S. Pat. Nos. 7,372,985 and 7,724,937 and in U.S. application Ser. No. 11/442,702 filed on May 25, 2006 and published as U.S. Patent Publication No. 2007/0057211, the entire contents of these patents and application being incorporated herein by reference. Further details of systems and methods of imaging sectioned samples and detecting time resolved data used in conjunction with preferred embodiments of the invention are described in International Application No. PCT/US2014/072368, filed Dec. 24, 2014 and published as International Patent Publication No. WO2015/100421, International Patent Application PCT/US2016/022106, filed Mar. 11, 2016 and published as International Patent Publication No. WO2016/145366, and International Patent Application No. PCT/US2011/060831, filed Nov. 15, 2011 and published as International Patent Publication No. WO2012/068142, the entire contents of these applications being incorporated herein by reference in their entireties. The processor 42 can be programmed with software that operates the system components and that processes image data as further described herein. The transport system 68 can move tissue samples for further processing and imaging as described herein. The processor 42 can then analyze image data from before and after sectioning to correlate and quantify data to characterize the tissue in detail. As sectioning can alter the surface morphology of the tissue, this can create difficulty in the process of correlating details in tissue structure after further processing and imaging. Preferred embodiments provide methods for analyzing image data from before and after sectioning in combination to characterize tissue.

Figure 2A:
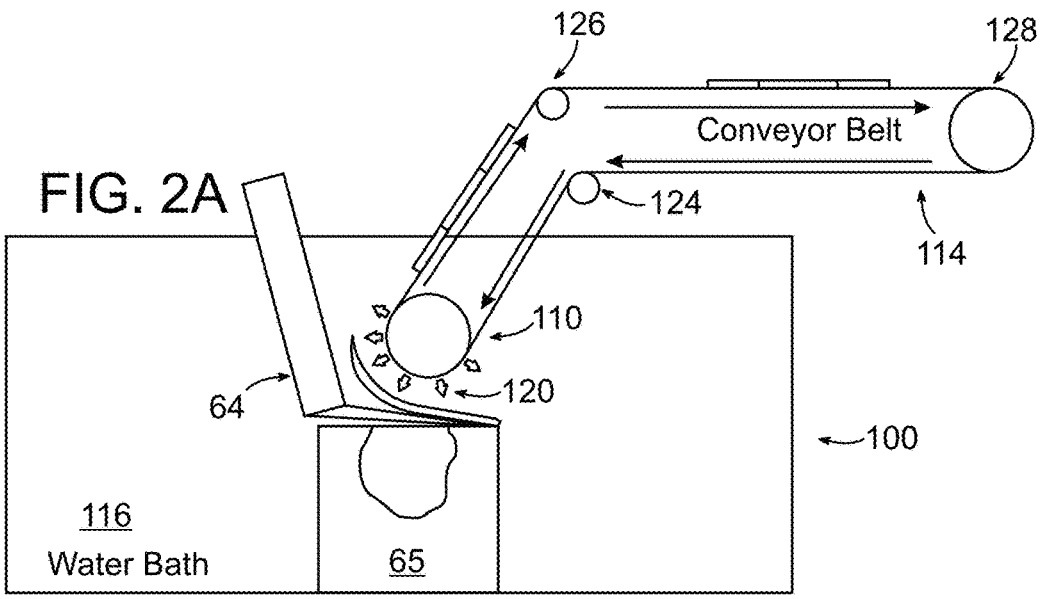
FIGS. 2A and 2B illustrate a conveyor concept.
Figure 2B:
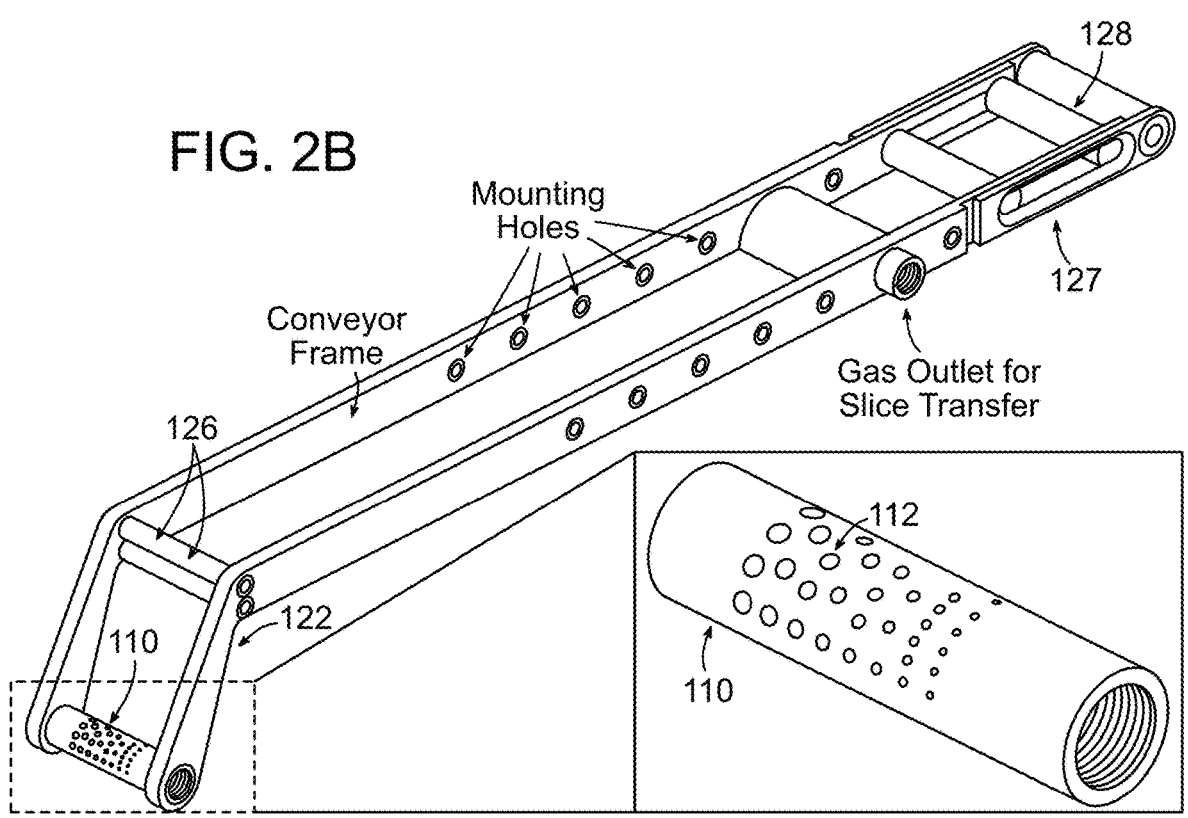

FIG. 2A shows a section capture system 100 in accordance with various embodiments described herein. To produce the attractive fluidic force, a combining fluidic inlet manifold is used as a capstan around which a transfer material slides. In some embodiments, the transfer material is a porous conveyor belt 114. For brevity, we will refer to this as the capstan inlet manifold 110, or CIM. Fluid is drawn through holes 112 in the outer surface of the CIM 110, and consequently through the porous conveyor belt 114, and then is recirculated into the bath solution 116 to preserve the fluid level. This fluid flow imparts drag onto the tissue section 120 to draw it toward the belt 114 via suction. Positive displacement pumps work well for this application because they are self-priming, provide consistent flow across a range of pressures, and can pull suction. A 3D CAD model of the conveyor concept is pictured in FIG. 2B wherein the belt 114 has been removed for clarity. One CIM design is depicted in the enlarged inset. A single threaded pipe coupling (e.g., NPT) is used to make a fluidic connection to the manifold header 122. In order to ensure approximately uniform suction along the length of the CIM 110, the hole sizing and number of holes 112 per axial position can be adjusted to prevent uneven forces that might damage the tissue or shift its orientation on the belt 114.

Figure 2C:
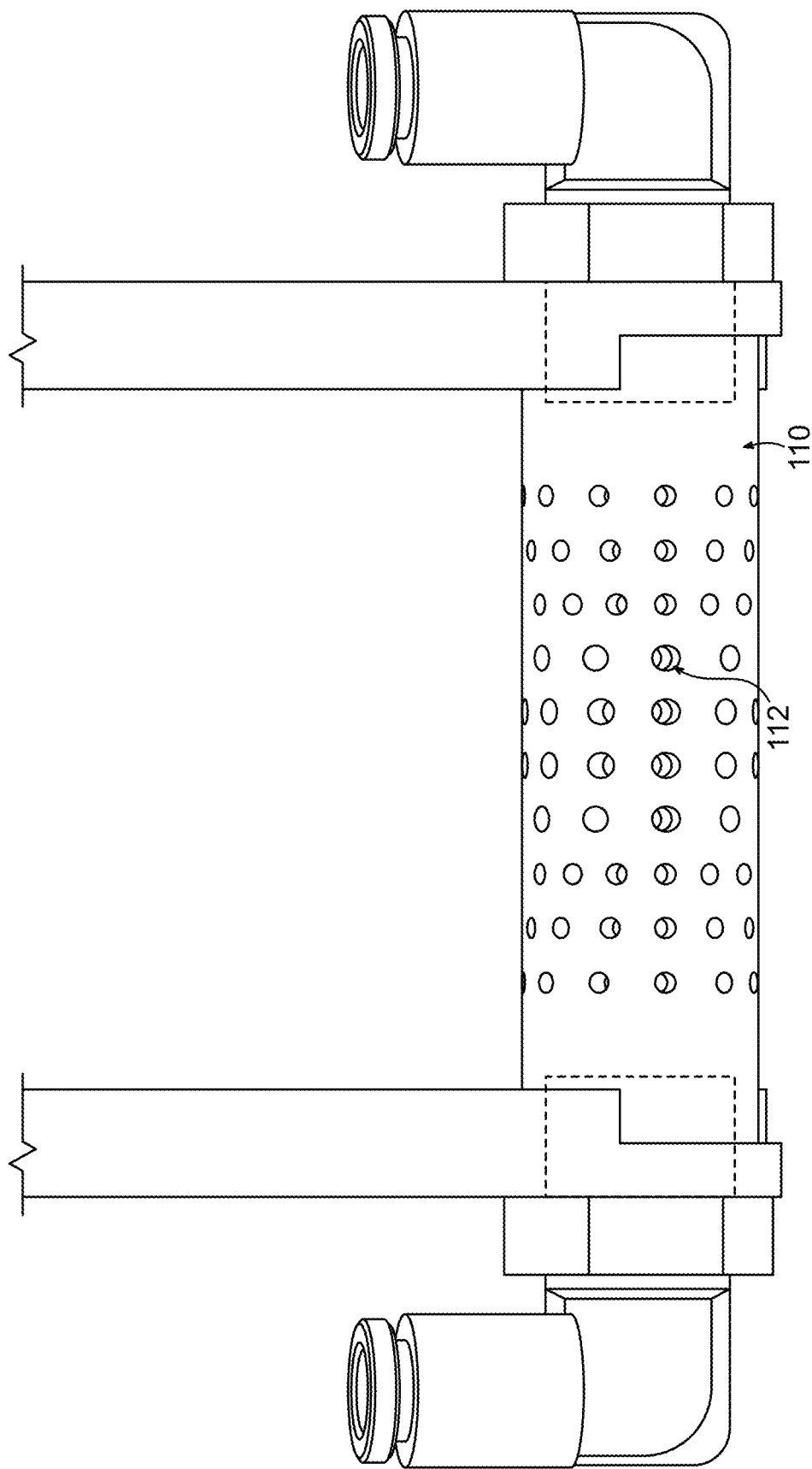
FIG. 2C illustrates an end view of the capstan inlet manifold (CIM) in accordance with various embodiments of the present disclosure.
Figure 2D:
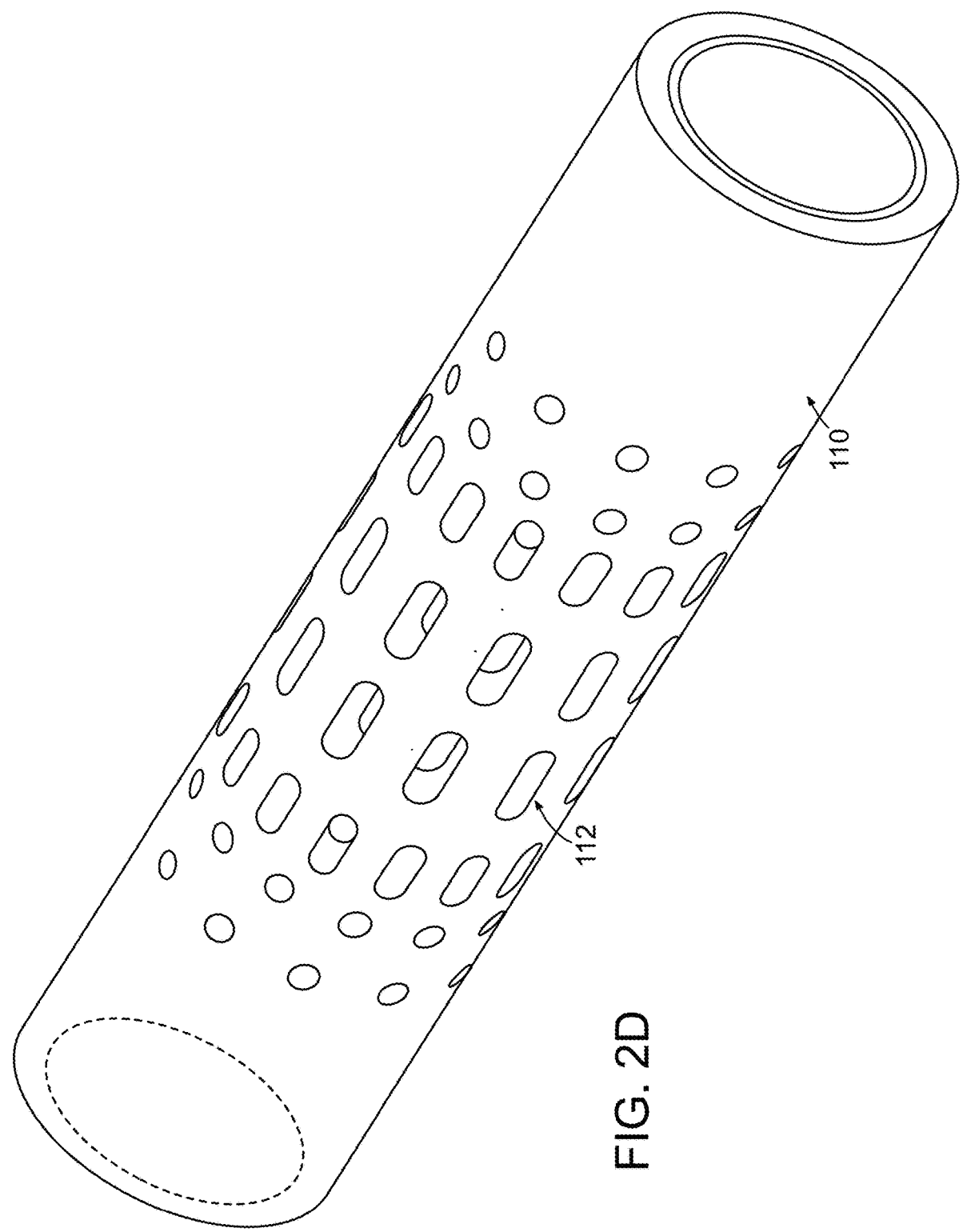
FIG. 2D illustrates a capstan inlet manifold (CIM) with an alternative hole layout in accordance with various embodiments of the present disclosure.

Use of a transfer material such as a porous conveyor belt 114 as described above or various film as described below advantageously allows the tissue sample 120 to be quickly attracted to and immobilized upon a physical substrate. By immobilizing the tissue sample 120 on a physical substrate, the tissue sample 120 is less likely to curl or otherwise be damaged such as might occur during extended transport under fluidic or suction forces. In addition, continuous transfer materials as described herein provide the ability to immobilize a series of tissue samples 120 in an orderly fashion (e.g., in a linear fashion along the film, tape, or belt). This overcomes a typical problem with sectioning wherein loose tissue samples floating in fluid can adhere to one another or quickly move out of order. FIG. 2C illustrates a capstan inlet manifold 110 in accordance with various embodiments of the present disclosure. The holes 112 are depicted as circular in this embodiments, and this shape is can be beneficial for machinability. However, the holes 112 in the CIM 110 can be of arbitrary size and shape to better control the local flow characteristics relative to the sample block. In some embodiments and as shown in FIG. 2D, the holes 112 of the CIM 110 can be slot-shaped. Computational fluid dynamics (CFD) software can be used to parametrically optimize the inlet size, shape, and distribution for optimal flow characteristics.

Figure 2E:
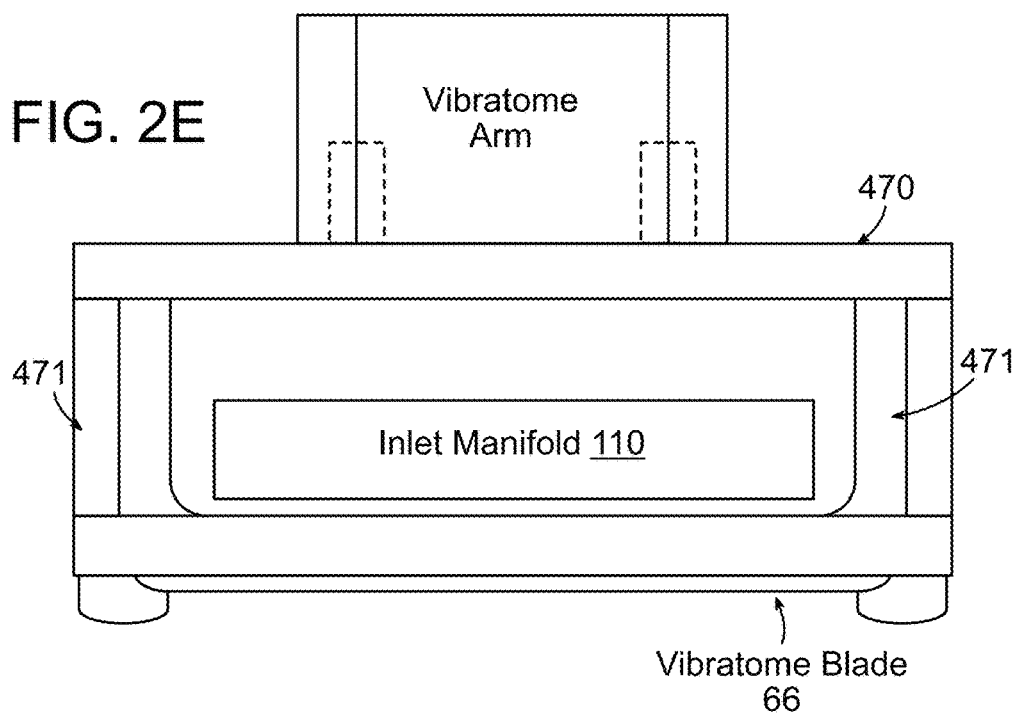
FIGS. 2E, 2F, and 2G show a side view, end view, and perspective view, respectively, of a vibratome blade holder and positionable inlet manifold in accordance with various embodiments described herein.
Figure 2F:
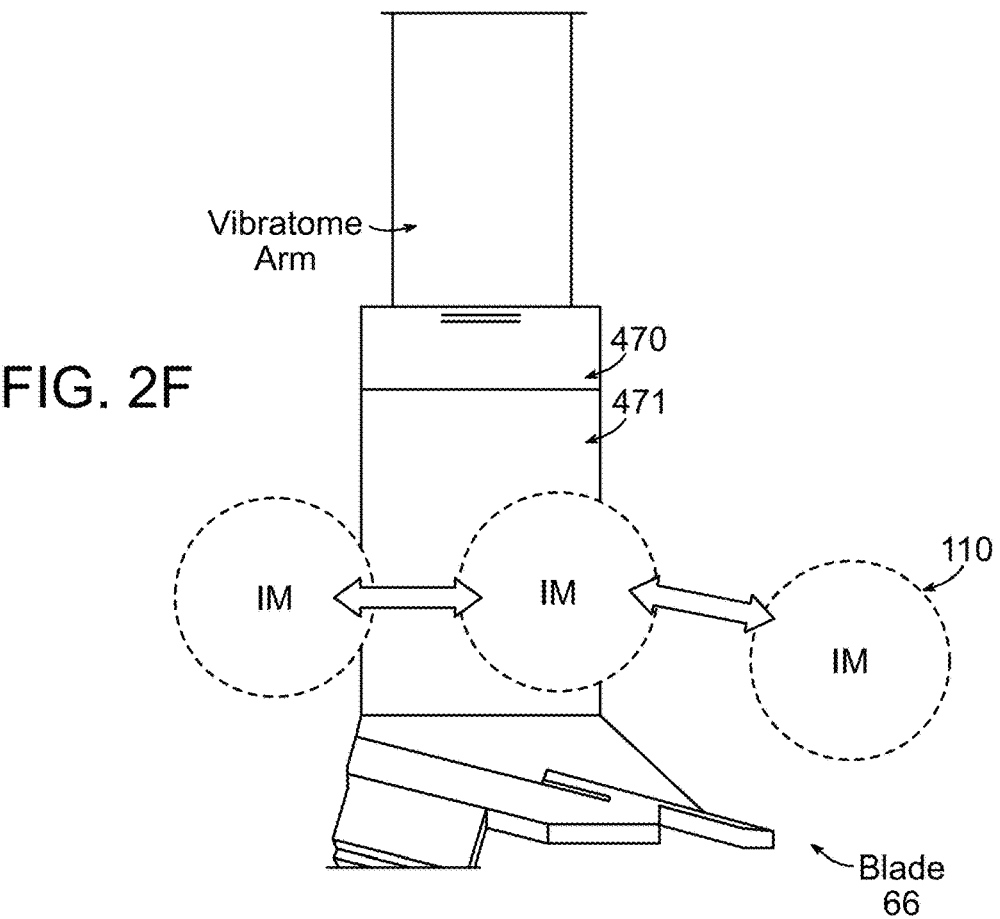
Figure 2G:
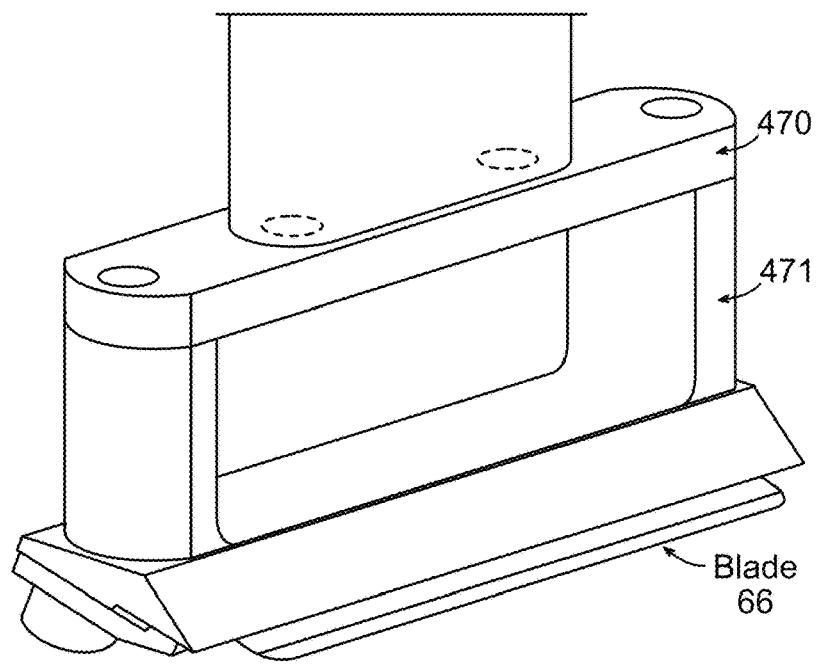

In some embodiments as shown in FIGS. 2E and 2F, the inlet manifold can be positionable. In some embodiments, the vibrating blade holder 470 can be modified such that the inlet manifold 110 can be positioned in the gap between the blade holder supports 471. In some embodiments, the inlet manifold 110 can be positioned arbitrarily relative to the edge of the blade 66. In some embodiments, the positioning of the inlet manifold 110 can be adjustable or even dynamic. For example, the inlet manifold 110 can move to accommodate different sample types or can undergo motion during capture to improve the mechanics of the capture of the tissue section 120.

In some embodiments, the gap between support arms 471 in the vibrating blade holder 470 can reduce the weight of the arm and also allow fluid flow to pass through. Because of this gap, there is a more direct fluidic pathway between the bath solution 116 and the CIM 110 to apply a more consistent fluidic force on the tissue section during capture, at more gentle flow rates. In this arm design, the pitch angle or "angle of attack" of the blade 66 is fixed to allow more rigidity in the arm and also to ensure consistent positioning of the blade 66 relative to the conveyor 114. To adjust this angle, the blade holder component can be swapped for one with a different, set angle. This is in comparison to alternative designs in which the entire arm is able to rotate to adjust this pitch angle. Such a design causes variability in the mounting position and local fluid dynamics around the blade that can cause inconsistencies in the capture of tissue sections.

Figure 3A:
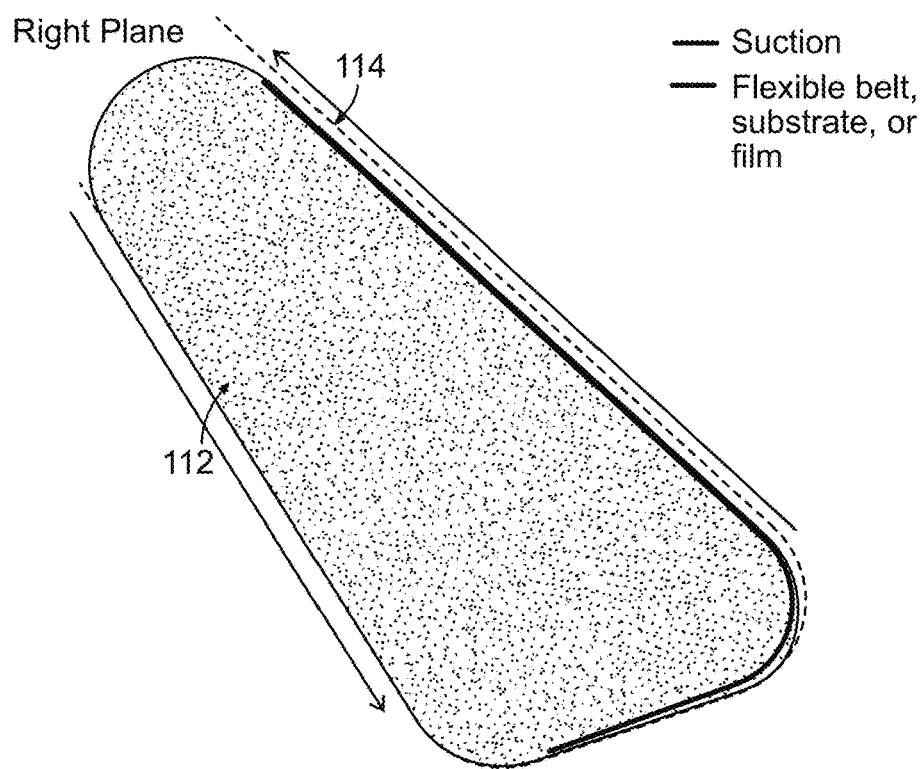
FIGS. 3A and 3B depict alternate conveyor capstan inlet manifold (CIM) cross sections including a wedge-type geometry and an elongated geometry, respectively. The CIM cross section is depicted by the dark grey shape. The red (inner) outline indicates the surface area where suction will be applied, the green (outer) curve represents the path of the conveyor belt, thin film, or flexible substrate. Arrows indicate the direction of motion.
Figure 3B:
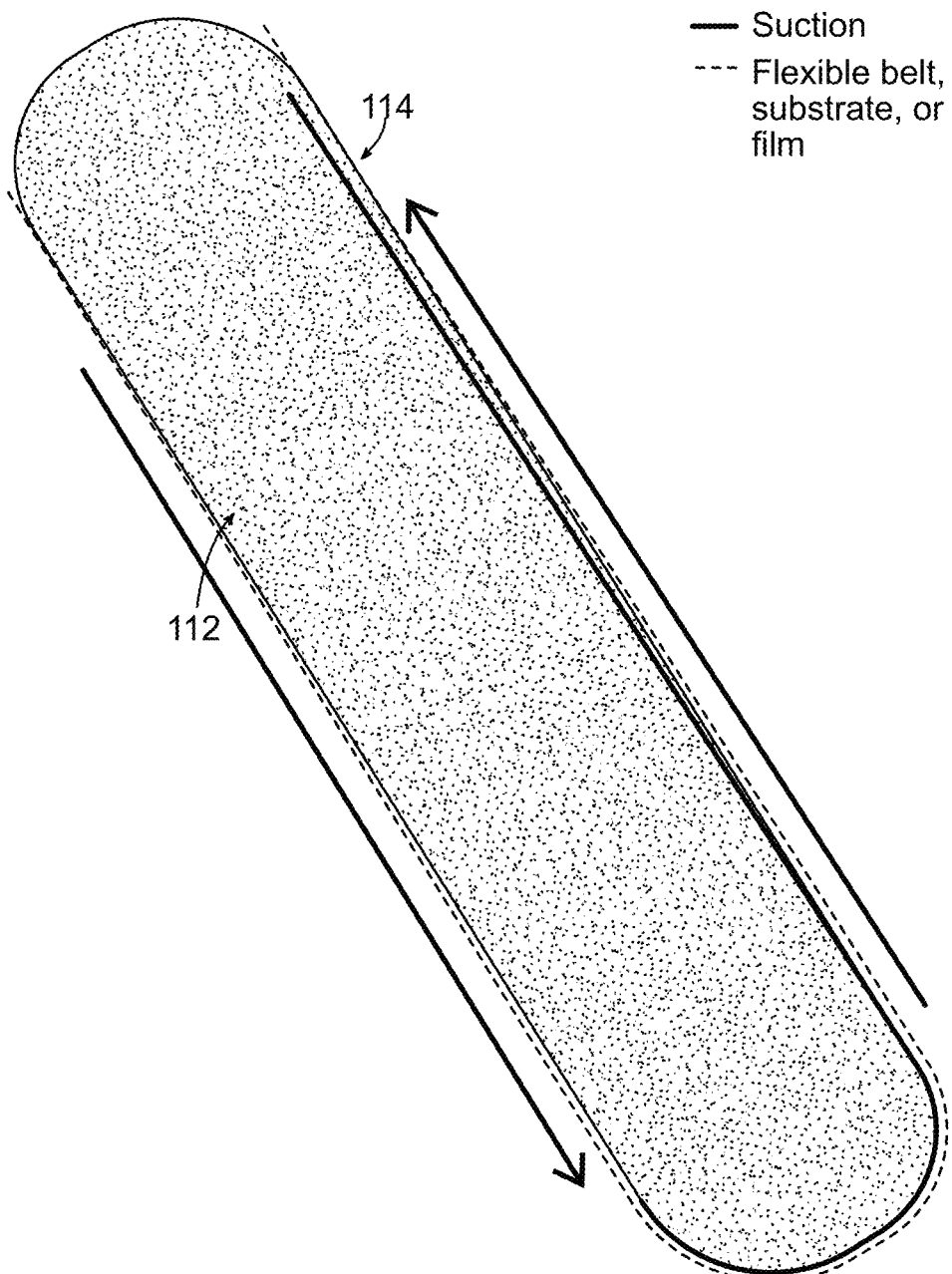

The simplest geometry for the CIM is a cylinder, but non-axisymmetric designs could be used to better-control the distribution of forces on the tissue section, as well as the belt motion. Two examples are depicted in FIGS. 3A and 3B.

In some embodiments, the conveyor belt 114 can pass around the CIM 110 at a steep initial angle to clear the bath walls and bend pulleys 126 before the motion is redirected horizontally. The conveyor can be powered by a drum-style drive pulley 128. The drive pulley 128 can be crowned in order to keep the belt tracking properly or can be mounted on a tensioning bracket 127 to allow for tension adjustment of the belt 114.

The use of a capstan 114, rather than a rotating pulley, avoids the need for underwater bearings and rotary fluidic couplings which add size, cost, complexity, and failure modes to the system. The capstan 114 can provide consistency in the applied suction because the inlet holes 112 are in a fixed position relative to the vibrating blade microtome 64. This design is possible because of the lightweight loading of the conveyor. The additional belt tension required to overcome the friction on the capstan is a factor of ~2, which is insignificant for this system. Low-friction polymer materials like Teflon or Nylon can be used for the CIM 110, and the bend pulleys 126 can be replaced with similar capstans in some embodiments. If wear or durability of the CIM 110 is a concern for a specific application, metal or ceramics can be used. The simplicity of the components means they can be easier and less expensive to swap for maintenance or in cases where cross-contamination is a concern with biological samples. The belt material can be a biocompatible, corrosion-resistant, and slightly hydrophilic polymer such as a Nylon or Polyethylene terephthalate (PET/Polyester) mesh, which is durable and inexpensive.

To prevent vibration from interfering with the sectioning process, the conveyor and its motorized components (motors, pumps, etc. . . .) can be mounted independently of the vibratome 64 and imaging device or isolated with damping materials.

Figure 4A:
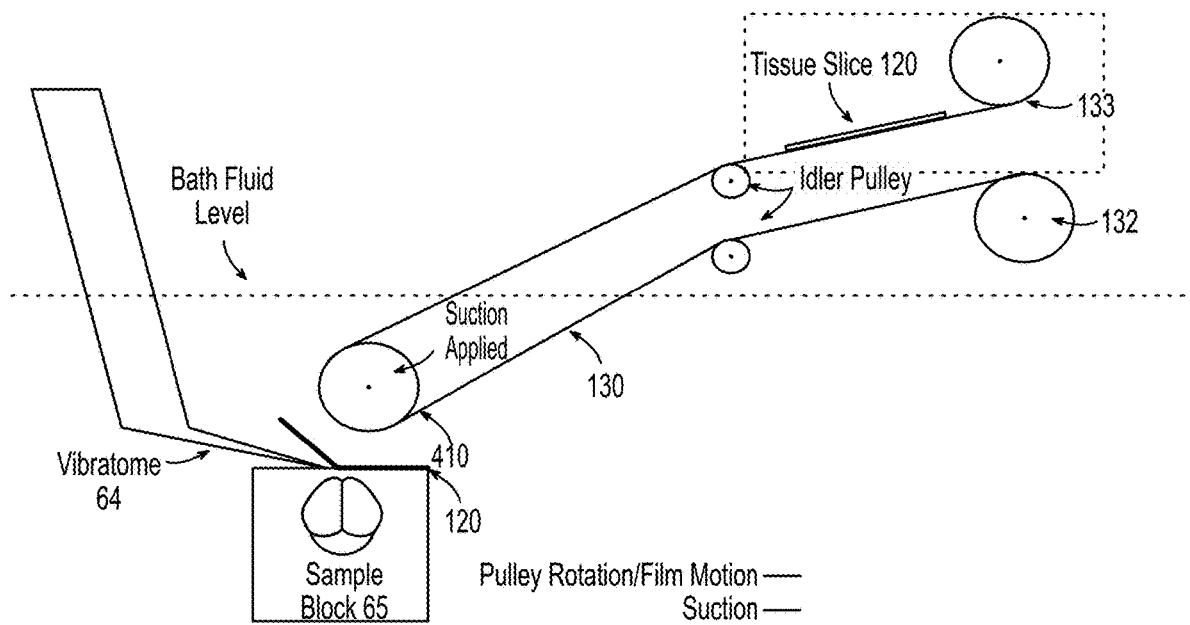
FIGS. 4A and 4B depict a reel to reel concept.
Figure 4B:
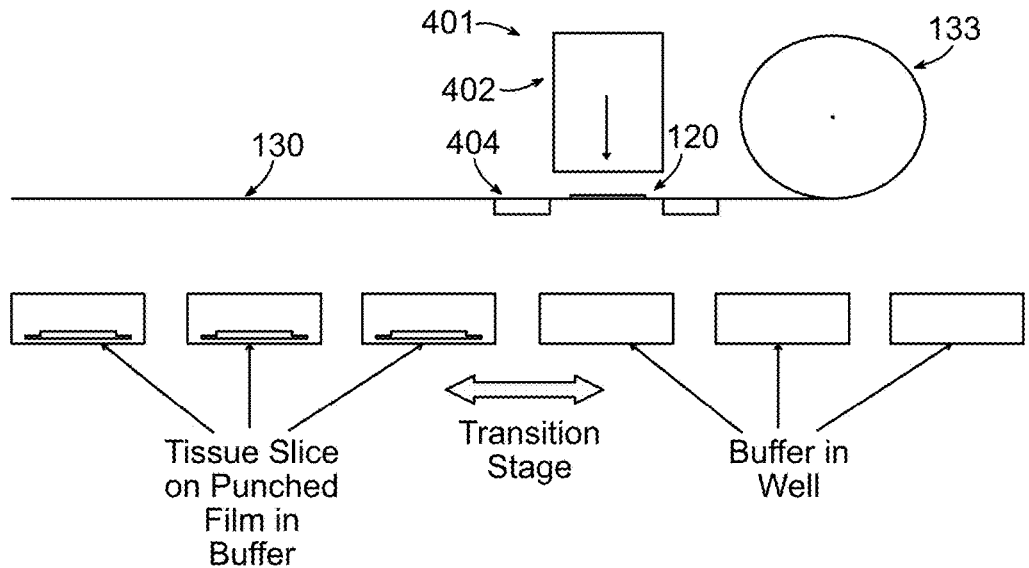
Figure 5:
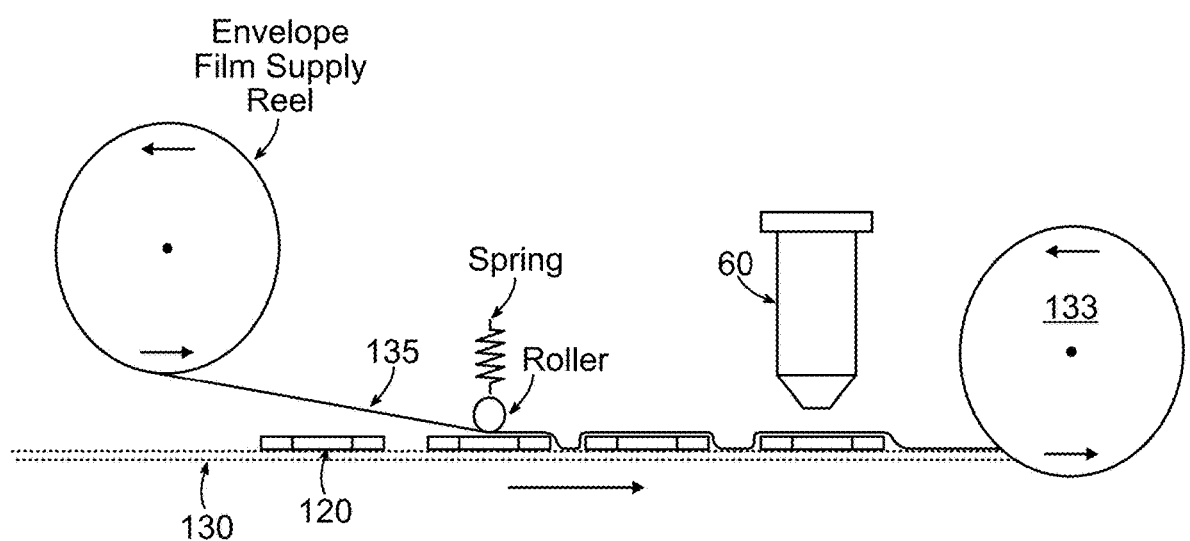
FIG. 5 illustrates envelopment and imaging of tissue sections. The tissue sections are captured or transferred to a thin film (depicted as perforated), and then enveloped with a secondary film. A spring-roller mechanism is depicted to help adhere the secondary film and acts like an idler pulley about which the two films are brought into contact. With certain optical properties, one could image through the thin film.

Instead of a conveyor belt 114, the same system configuration for tissue section capture can be used with a different transfer material in the form of a porous film 130 in a reel-to-reel configuration, with a supply reel 132 and a storage or take-up reel 133, as depicted in FIG. 4A. This is desirable in cases where cross-contamination from the belt 114 is a concern or where it is desirable to capture and store sections in a linear array directly on the film 130. This also allows the film 130 to be easily switched for different samples. A secondary enveloping film 135 can be used to completely envelop the tissue sections 120 to preserve them for storage or secondary imaging, assays, or analysis, as shown in FIG. 5. This film 135 can be selected to have specific properties, such as index of refraction, porosity, or chemical functionalization depending on the secondary assay. For example, the index of refraction can be selected such that the film strip/reel of sections can be directly fed into a microscope system for further imaging, performing the same role as a cover slip. The film reel 130 used in the concept in FIGS. 4A-4B can be disposable such that an automated die cutter 401 including a punch press 402 and die 404 can punch out the portion of the film containing the tissue section (FIG. 4B). Thus, the section 120 is well-supported by the film 130 and can be more easily handled, using the die-cut film as a pallet. In place of the conveyor mechanism, the section can be directly captured onto a porous substrate using the same fluid mechanisms. An end effector on a robotic arm can have a fluid intake with a detachable mesh substrate through which the fluid would flow. The tissue section 120 is captured onto this substrate via similar fluid drag or suction force and removed from the water bath where then surface tension would be sufficient to hold it in place. The substrate with the tissue section adhered is then deposited into storage or a secondary handling system and a fresh substrate can be attached to the end effector.

Thin tissue sections have a propensity to curl into a cylindrical conformation as they are cut from the sample block, which would be difficult to unravel in an automated manner for applications like microscopy, which require sections to be flat. This phenomenon can be avoided by drawing the section into a stable, flat conformation during the sectioning process before it is able to curl. This can be accomplished by running the pump and conveyor belt 114 during sectioning to adhere the section 120 to the transfer material such as the porous conveyor belt 114. The movement of the conveyor belt 114 and periodicity of the pore spacing can serve to smooth out pulsations in the flow from displacement-style pumps, preventing suction forces from being concentrated at specific points on the tissue section.

The conveyor belt porosity can be carefully selected such that pores are large enough to not significantly disrupt the fluid intake into the CIM 110, but small enough to provide sufficient support to delicate tissue sections. Plastic filtering meshes tend to work well for this application, with pore sizes on the order of 0.1-1 mm, with the added benefit of being corrosion resistant, durable, biocompatible, and inexpensive. Polyethlylene terephthalate (PET) and Nylon can work well. Ultrasonic welding can be used to join belt ends.

Figure 4C:
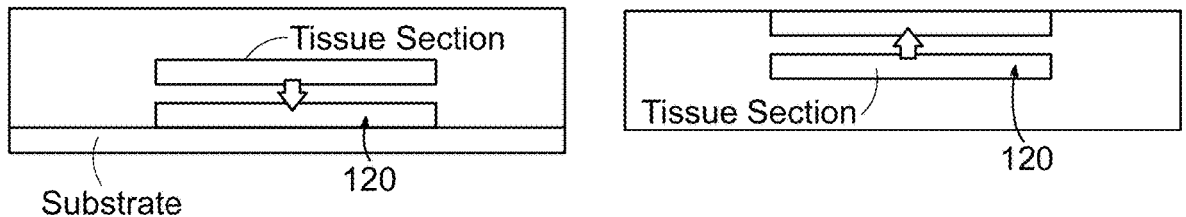
FIG. 4C depicts adhering and de-adhering of tissue sections from a belt by adjustment of fluid density in accordance with various embodiments described herein.

In lieu of an attractive fluidic force that uses suction/drag to attract the tissue section, alternative physical forces could be used. These include electrical forces such as electrophoresis or dielectrophoresis, thermophoresis, magnetic forces, chemical attraction/adhesion, and direct physical contact, such as with a gentle mechanical gripper, or any combination thereof. For example, the fluid force attracts the tissue section 120, and then a chemical surface functionalization promotes short-range adhesion to the belt 114 or film 130. This functionalization entails a chemical bond or electrostatic attraction. The ionic composition and pH of the buffer solution can be modified to adjust the range and strength of the interaction between the tissue section 120 and substrate, for example using low ionic strength and low pH to facilitate longer range and stronger electrostatic interactions between a negatively charged tissue and positively charged substrate based on adjustment of the Debye length and zeta potential. As shown in FIG. 4C, the density of the bath fluid 116 can also be modified, for example to adjust the buoyancy of the sections and cause them to float at the fluid interface. This is desirable because the section can remain well-spread at the interface where it can be easily skimmed with a flat conformation. For some section capture configurations the embedding media can be modified, for example by embedding dielectric or magnetic beads to control the magnitude and distribution of forces on the section. Such beads can be also used as markers for image registration. The embedding media can be further adjusted based on the desired assay. For example, low melting point agarose (LMA) can be used as an embedding media because it is easily melted away at temperatures that do not damage fixed tissue. This mechanism can be used to isolate the captured tissue sections from the embedding media in applications where the embedding media is undesired. For example, one can remove the embedding media if placing multiple tissue sections onto a slide, to maximize the amount of sections per slide to reduce cost of reagents or imaging services that accrue cost on a per-slide basis. Other embedding methods, including those that permeate the tissue, such as employee not just agar but also hydrogels, can be used to both improve sectioning. In addition these embedding methods can help crosslink the tissue to the surrounding agar/hydrogel block in order to prevent the tissue from popping out of the agar block while being sectioned or transferred.

To improve the bonding of tissue to its embedding media and ensure the production of intact tissue sections for the section capture system, fixed tissue samples can be embedded in agarose (4.5-6% typical) that has been oxidized with sodium periodate to promote bond formation with proteins on the surface of the tissue. The sample block can be subsequently soaked in a solution of acrylamide and bis-acrylamide monomers overnight to infiltrate the block and the tissue. The acrylamide copolymers can then be thermally polymerized to polyacrylamide the following day with a 2 hour heat treatment at 40 C, resulting in 4-10% polyacrylamide. A HEMA copolymer can be added in similar percentages to the polyacrylamide to reduce expansion of the sample block in aqueous buffers due to water absorption. These polymers crosslink through the tissue resulting in a more homogeneous block and improvement in section quality.

Figure 4D:
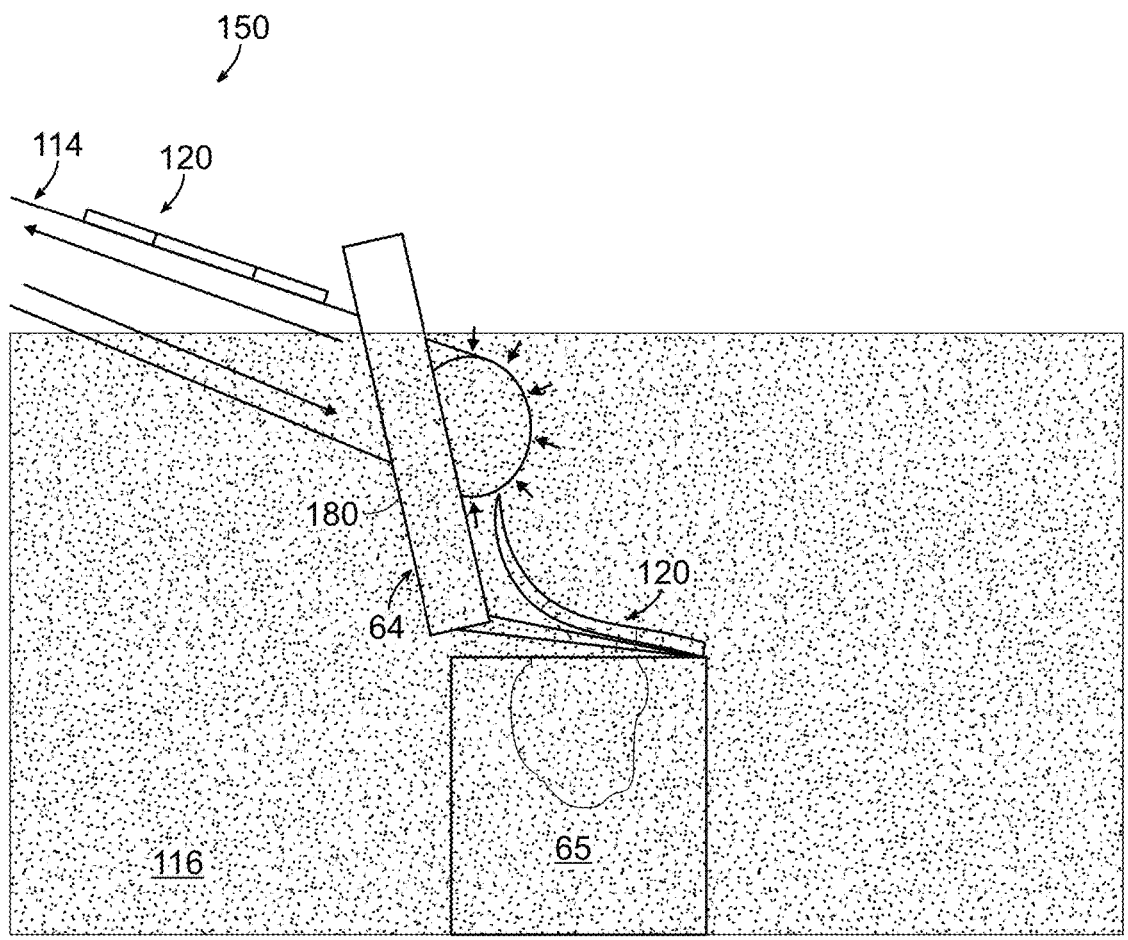
FIGS. 4D and 4E illustrate first and second section capture systems in accordance with embodiments described herein.

FIG. 4D illustrates a section capture system 150 placed on the opposite side to embodiments described previously. The section capture system 150 can include a capstan inlet manifold 180. The capstan inlet manifold 180 can attract the tissue section 120 from any desired orientation. In some embodiments, the section capture system 150 can allow mounting of the tissue section 120 with a different side facing upwards. In various embodiments, different configurations may allow better access in terms of mounting and clearances depending upon system configuration and integration.

Figure 4E:
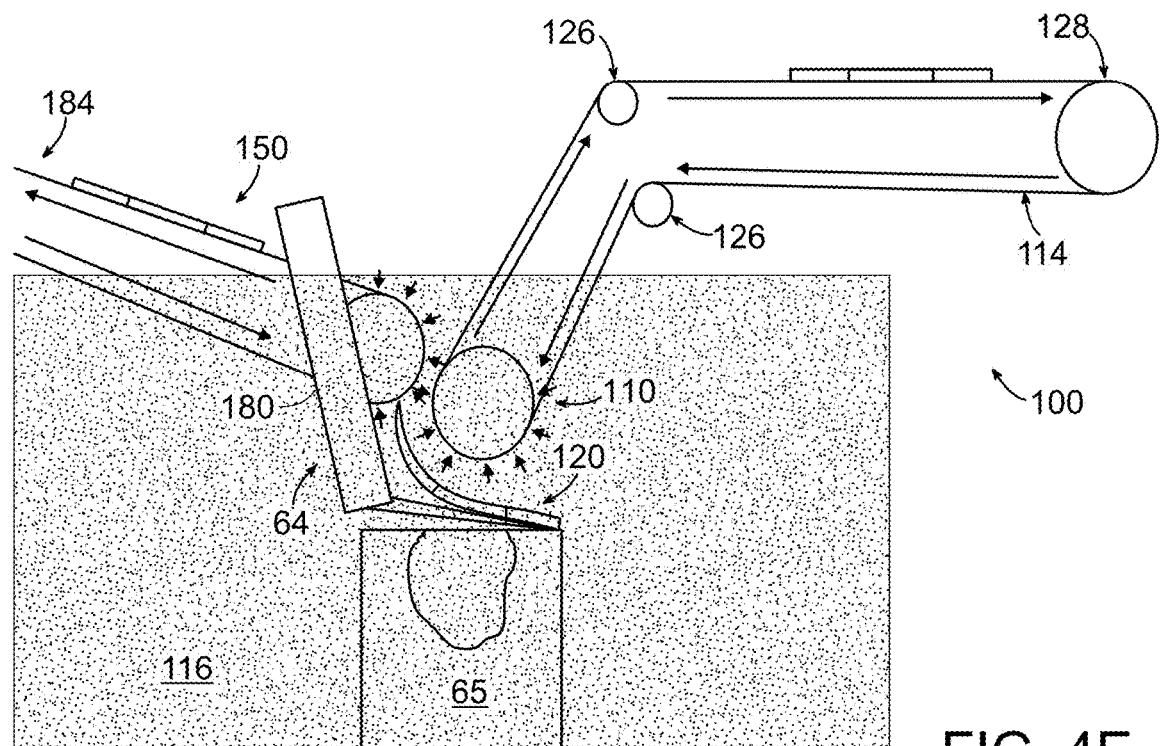

FIG. 4E illustrates the first section capture system 100 working in concert with a second section capture system 150. The second section capture system 150 can include a second manifold 180. When two or more inlet manifolds 110, 180 having different shapes or intake parameters are used, the manifolds may be used in concert to better control the capture mechanics and transport of the tissue section 120. For example, the second section capture system 150 can be used to selectively divert certain tissue sections 120 to a different storage area or analysis pipeline. In some embodiments, the two section capture systems 100, 150 can work in concert to invert the tissue section 120 in a controlled manner.

The capstan design is simple and effective, but if necessary for certain belt/CIM materials or loading conditions, the capstan 110 can be replaced with a pulley 410, with a similar inlet manifold integrated within it. This pulley system requires a rotary fluid coupling and underwater bearings or bushings to allow it to rotate with the belt underwater, and may need to be made of higher-friction materials or integrate timing belt grooves to ensure that the belt does not slip (timing belt strips can be integrated into the porous belt/film in this case).

The system configurations as described so far use a vibrating blade microtome 64 in an aqueous buffer solution, cutting soft tissue embedded in a hydrogel like agar, agarose, or polyacrylamide, or hydrogel. A cryostat embodiment of the section capture system can use the same capture mechanism, except that it can be cutting frozen tissue with either a vibrating blade microtome 64 or microtome. The liquid buffer can be selected such that it can keep the tissue sample frozen during sectioning, for example using liquid nitrogen/isopentane mixture, or some other supercooled bath solution. This liquid buffer is necessary in order to take advantage of the fluidic forces to gently capture the tissue section. The tissue can be flash frozen in a standard cryo sectioning media, such as optimal cutting temperature compound (OCT). The system materials can be adjusted and insulated to operate at this lower temperature and in the presence of significant temperature gradients. The optics can be adjusted to image the frozen sample with multi-photon microscopy. The benefits to frozen sections are that they can be cut much thinner which is desirable for some assays, and also that fresh tissue can be used (not fixed) which helps preserve the biochemical composition of the tissue.

After sections detach from the sample block, they are conveyed out of the bath solution. To prevent asymmetric forces from acting on the sample and causing its orientation to shift on the conveyor, the CIM can be carefully designed to apply approximately uniform flow along its length. A symmetric design further ensures that the forces acting on the tissue section are symmetric if the sample is centered.

Once captured, it is important to be able to transfer the tissue section to a desired substrate for storage, secondary processes, or general handling. A typical example of such substrates is microscope slides, which are inexpensive, compact, and readily integrate with many standard laboratory systems. After the position of the tissue section is known, the tissue section is moved into the transfer region of the conveyor. In this region, the belt is oriented horizontal by pulleys and the conveyor frame has a cutaway to allow access to the belt. This region is designed to be on the underside of the conveyor frame and surface tension is sufficient to hold the tissue section upside-down. This allows the section to be transferred to the top surface of the slide, provides the most room for access from the slide-handling system, and also means that gravity will assist in the detachment of the tissue section, both due to its force on the section itself, and because it acts on any residual liquid on the section to promote the formation of a capillary bridge between the section and slide below it.

Once in the transfer position, the slide handling system moves the slide upwards until it gently contacts the tissue section and the section is completely conformal to the surface of the slide. Microscope slides are highly hydrophilic, and so the surface tension and gravity will tend to cause the section to preferentially adhere to the slide, compared to the plastic mesh which is typically mildly hydrophilic or even hydrophobic depending on material. At this point a gentle jet of gas, typically air, is applied to the back side of the porous conveyor to assist in detaching the section from the belt. As the gas flow impinges on the section, the slide is slowly lowered until the section is completely detached from the belt, and laying flat on the slide.

To transfer tissue sections from the section capture system 100 for storage or handling, surface tension forces are used to manipulate the tissue section 120 into position, and a gentle fluid-inertial force can be applied via a jet of gas to transfer the tissue section 120, without damage, to an adjacent well, tube, container, substrate, slide, or film. This is depicted schematically in FIG. 6A. The tissue section 120 on the conveyor is allowed to pass around the drive pulley 128 until it is held in an inverted orientation by surface tension. Taking advantage of this mechanism, the tissue section 120 is passed beneath a nozzle or outlet 602 of a controlled gas flow system. A pulse of air or inert gas, for example, nitrogen or argon, is then applied to the backside of the porous conveyor belt 114 or film 130 when the tissue section 120 is centered below the gas outlet 602. The gas flows through the pores in the belt 114 or film 130 and applies a distributed fluid inertial force, aligned with the gravity vector, to the backside of the tissue section 120. The downward force is approximately equal to the weight of the tissue section 102 plus the momentum transfer from the impinging gas jet, which can be fine-tuned by controlling either the gas supply pressure or the gas velocity. The gas used may be any inert gas, though air is the simplest and safe in most environments. It may be compressed, or supplied by a blower, and the control may be pressure or flow-based. The dynamics of the gas jet may be varied to assist in detaching more cleanly, for example ramping the flow up or down, pulsing the flow or moving the nozzles to follow a specific pattern. A position sensor can be used to feedback the position of the tissue section 120 on the belt 114, and can help guide the position of the section relative to the gas outlet region. The tissue section 120 is depicted being transferred to both a well 612 or flat substrate such as a glass slide 614 in FIG. 6A. FIG. 6B-C is a CAD model of the gas outlet 602. The purpose is to direct the gas flow downwards through the belt 114 uniformly. FIG. 6D is a photograph of a mouse coronal brain section that was transferred from the conveyor to a flat substrate 614 with a pulse of compressed air, controlled via a solenoid valve. The flat substrate 614 is a microscope slide that can be treated to promote tissue adhesion, as depicted schematically in FIG. 7A.

The gas jet may not be required in some cases, and surface tension/gravity may be sufficient alone to cleanly detach tissue sections onto a substrate. The surface tension can also be modified to adjust the adhesive properties of the section, for example by adding surfactant or adjusting the ionic composition of the capillary bridge.

The adhesion of the tissue section can also be broken by eliminating the liquid interface between the tissue section and belt. This can be done by submerging the belt and section in liquid to eliminate the interface, at which point the section will sink or float depending on the density (buoyancy) of the section and liquid as described above in relation to FIG. 4C. Typically agarose-embedded samples are denser than water and will sink. This mechanism of detachment is very gentle and may be desirable for thinner or more delicate samples. If the liquid is denser than the section, the section will float and spread on the surface which could also be useful for manipulating delicate sections.

In place of the gas jet to transfer tissue sections, a user can also use a liquid jet or fluid flow system 705 as shown in FIG. 7B. This can be desirable to serve a dual purpose, for example dispensing of stain or buffer simultaneously with transfer of the tissue section 120 into a well 612, tube, or other container or substrate 710. A mechanical gripper or suction lift can be used on a robotic end effector to pick up the section 120 from the belt 114 or film 130 and deposit it into storage. The section 120 can also be brought into direct contact with a surface or substrate 710 that is more hydrophilic than the belt 114 or film 130 onto which the section 120 is captured. This can be achieved in various embodiments through movement of the substrate or movement of the belt. A capillary bridge formed between the tissue section and this substrate 710 can more strongly adhere the section than without the capillary bridge, especially when aided by gravity if the slice is inverted on the belt 114 or film 130. This can be sufficient to detach the section 130 onto this secondary substrate 710, and a gently pulse of gas could further aid in detachment.

In some embodiments, the substrate 710 could be coated with a thin film of liquid and moved upwards until the section is submerged in the thin film of liquid. This substrate 710 can be patterned with hydrophilic or hydrophobic surface functionalizations such that the liquid film has a consistent and controlled size and shape, or it could be constrained by a shallow well. Additional liquid can be applied to the backside of the conveyor belt to help envelop the section in liquid to eliminate the capillary bridge. This additional liquid could also be used to apply a fluid-inertial force to the section to assist in detachment. This fluid composition could also be adjusted depending on the application, for example including surfactant, histological stain, or various buffers, and need not be an aqueous solution. One of the potential benefits of trapping a tissue section in a thin film of fluid is that the fluid interface may help constrain the conformation of the tissue section, preventing it from curling or folding.

An alternative to the transfer system described can be to use a reel-to-reel arrangement as described previously and depicted in FIG. 5 and FIG. 6. In this configuration the sections 120 are either stored directly on the reel 133 or punched out with a die cutter 401, requiring no technique to transfer them from the porous substrate/film/belt upon which they are initially captured.

Tissue sections 120 can be stored in a wide assortment of different containers or substrates depending on the application of interest. The two most widely desirable storage methods would be directly on glass microscope slides 614 or in well plates 612. The gas-jet transfer technique is highly robust because it can reliably transfer tissue sections 120 to flat substrates 614 without loss of conformation, but is general enough to deposit the section into open containers 612 as well. As an alternative, a fluid flow system can be used to detach the tissue section 120 from the conveyer and onto the slide 614 or collection chamber 612. As depicted in FIG. 8A, sections 120 can be transferred to microscope slides 614, which are ubiquitous, compactly stored, readily functionalized, and compatible with automated systems like cover-slippers, stainers, and slide scanning microscopes, automating the entire sectioning, slide mounting, staining, and imaging process in addition to the 3D imaging data attained using STPT. As depicted in FIG. 8B, well plates 612 are desirable for thicker tissue sections (>50 microns) because many secondary assays use staining techniques that require the section to float freely in a solution. As depicted in FIG. 8C, tissue sections 120 can also be stored on a secondary film strip 132 in a linear array that could be fed into other systems. Multiple sections can be stored per substrate, well, tube, or container if desired.

In addition to slides and well arrays, tissue sections can be deposited into tissue storage tubes or custom well arrays. Tissue storage tubes are desirable in cases where the sections are to be frozen for future analysis. If a researcher wished to perform a secondary assay on a single tissue section, he/she need not defrost the entire batch of tissue samples, just the specific tube of interest. Custom wells, substrates, or arrays of wells/substrates can be desirable in cases where custom storage features are desirable, such as integrated fluidic channels, higher storage densities, custom geometry, or compatibility with specific systems.

Figure 9A:
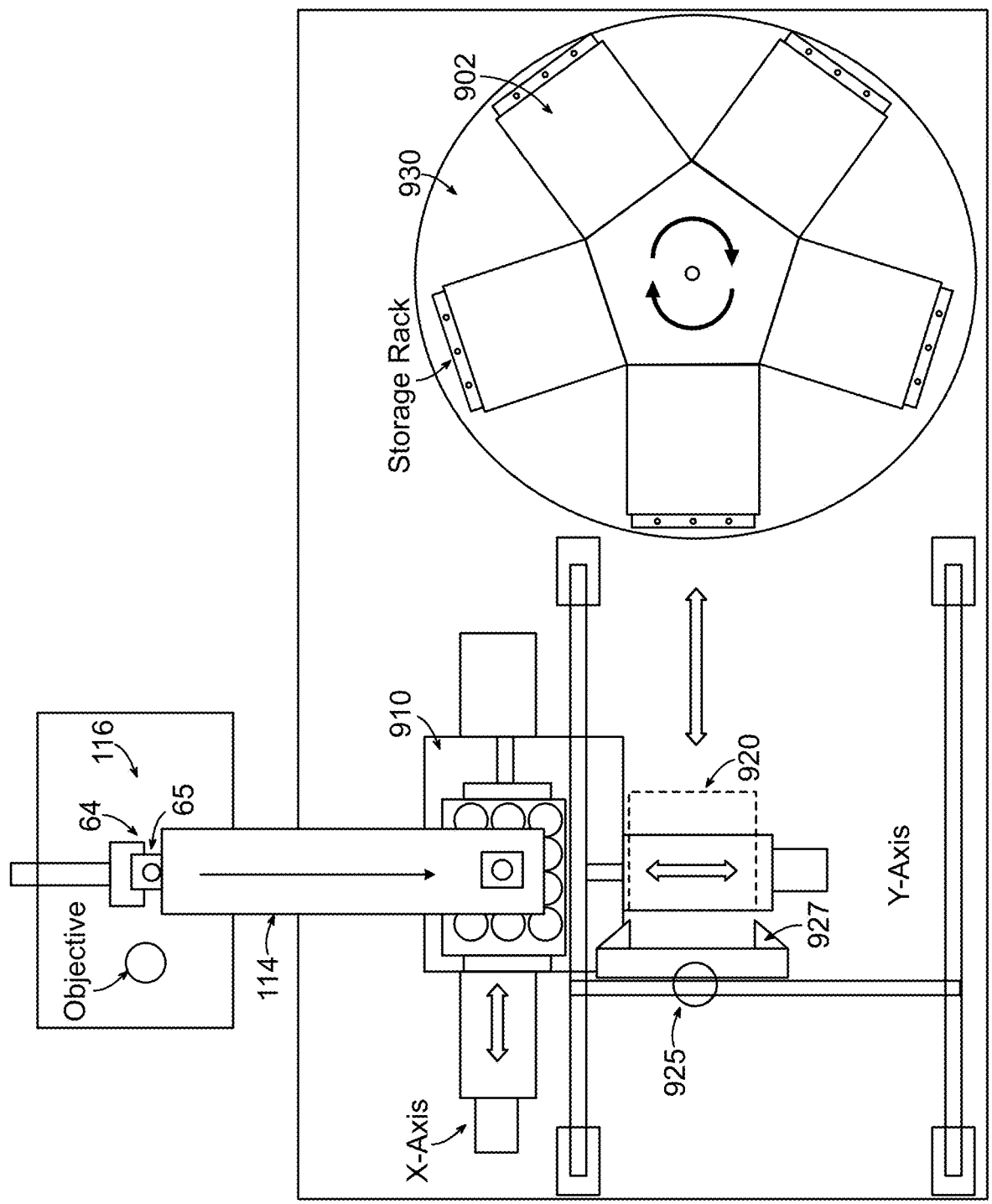
FIGS. 9A and 9B depict automated storage systems.
Figure 9B:
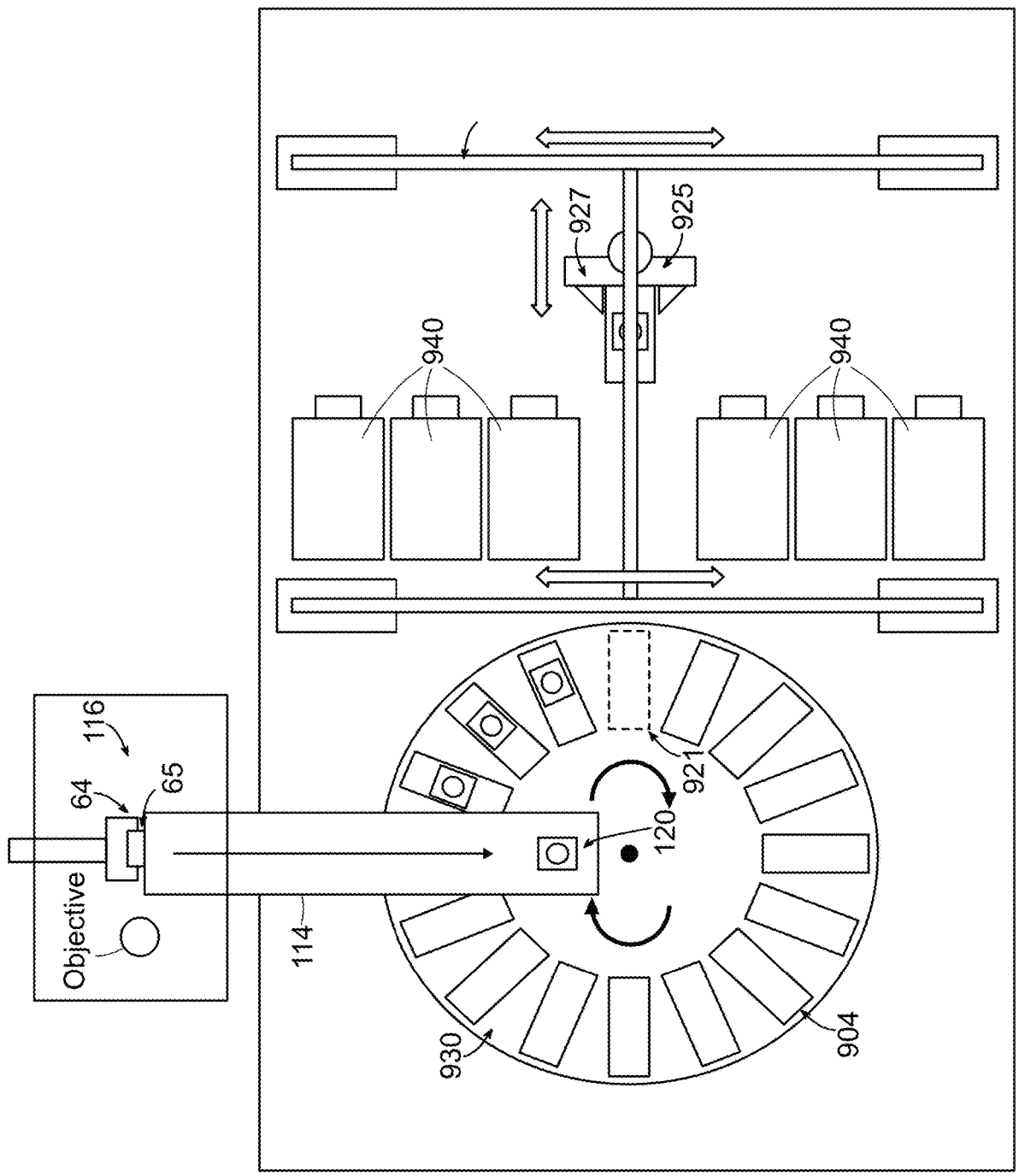
Figure 10A:
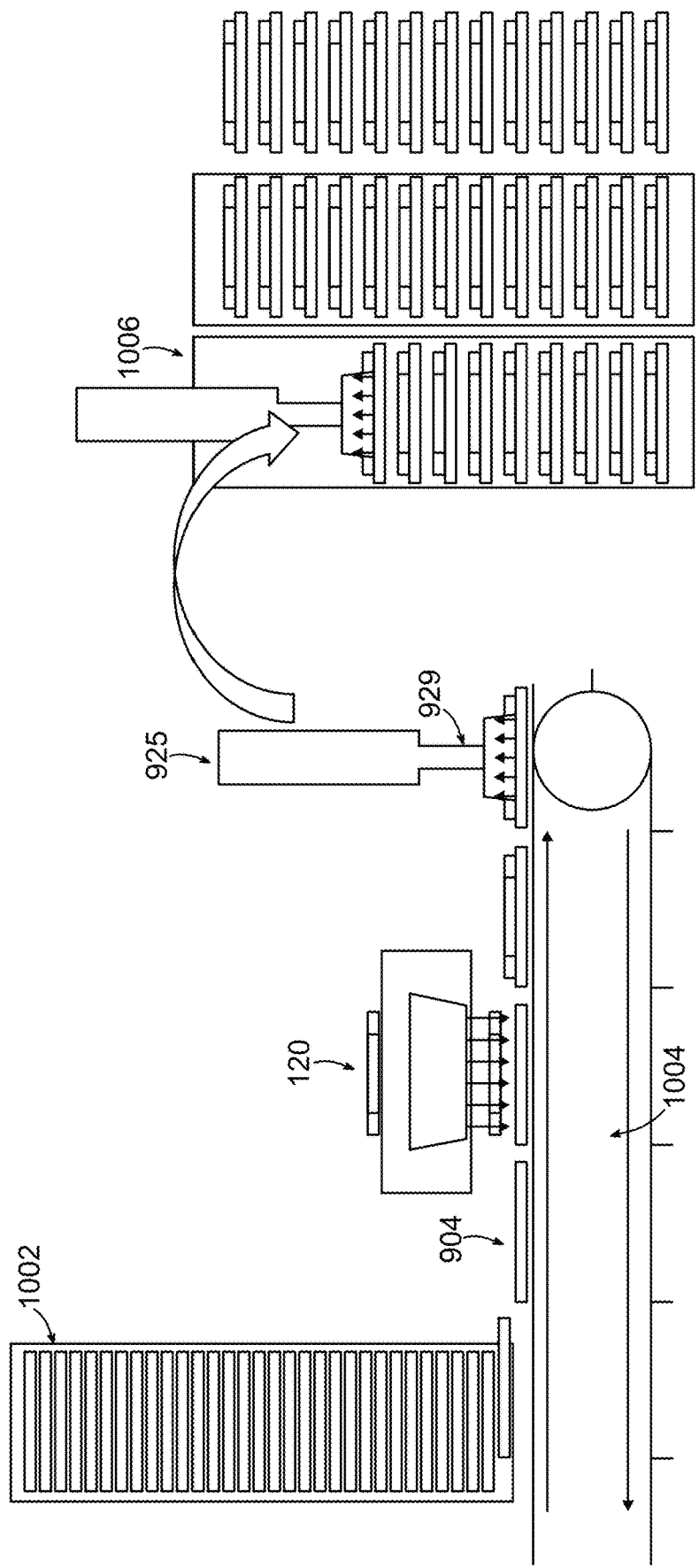
FIGS. 10A and 10B depict tissue section storage automation concepts.
Figure 10B:
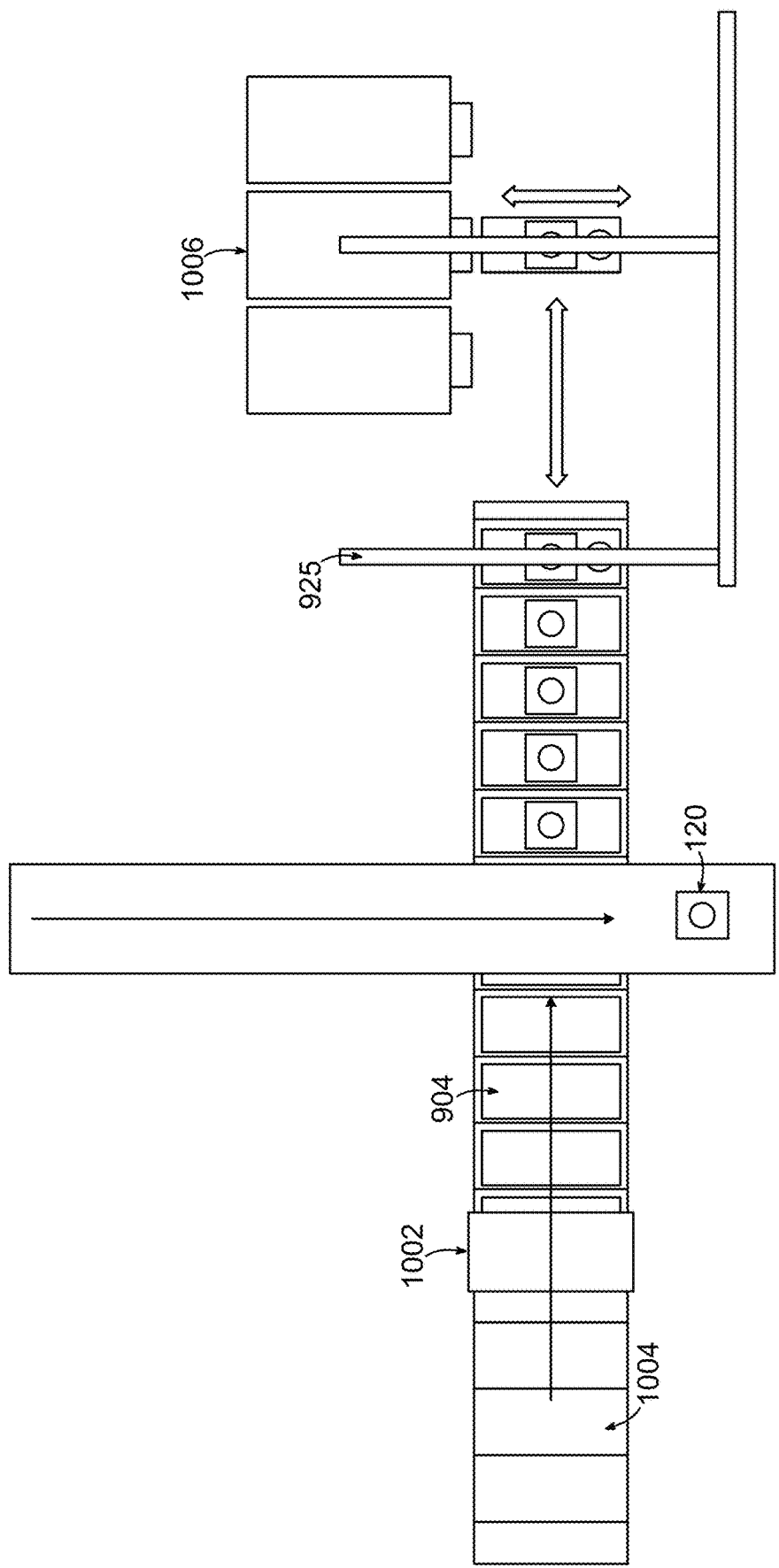

The storage process can be further automated, and several examples are depicted schematically in FIG. 9 and FIG. 10. FIG. 9A shows a layout for depositing tissue sections into well plates 902. The well plate 902 is on a motorized XY stage 910 that positions the wells below the transfer region of the section capture conveyor belt 114. Tissue sections are deposited into the target wells. After the plate 902 is full, the XY stage 910 moves it to a pickup location 920 where a gantry robot 925 uses a mechanical gripper 927 to pick up the well plate 902 and store it in a rotary carousel 930. The gripper 927 then grabs an empty well plate 902 from the carousel 930 and replaces it onto the XY stage 910. The system in FIG. 9A can also be used with a rack of tissue storage tubes or an array of microscope slides, which could be manipulated in the same manner using the XY stage 910 and gantry robot 925, and stored on shelves in a rotary carousel 930. Such a system designed to handle individual microscope slides is depicted in FIG. 9B. Blank slides 904 are placed on a carousel 930 and tissue sections 120 are deposited. The slides with tissue sections on them are then picked up by a gantry robot 925 with a mechanical gripper 927 and placed in a slide storage rack 940. A fresh blank slide 904 is then taken from a supply rack 940 and replaced onto the carousel 930 at the loading and unloading position 921. This system can also be used with individual tubes, substrates, or storage containers in the same configuration provided that the storage racks are adjusted accordingly. FIGS. 10A and 10B depict an alternative embodiment for slide storage using a flighted conveyor belt. FIG. 10A is a schematic side view and FIG. 10B is a schematic top view of the system. A slide dispenser 1002 places slides 904 on the conveyor 1004 using a passive mechanism, and this conveyor 1004 passes below the conveyor 114 of the section capture system conveyor 100. The tissue sections 120 are transferred onto the slides 904 on this secondary conveyor 1004, which is incrementally moved. A gantry robot with mechanical gripper 927 or suction lift 929 (shown) picks up the slide 904 with a tissue section 120 and places it into a storage rack 1006.

Figure 11:
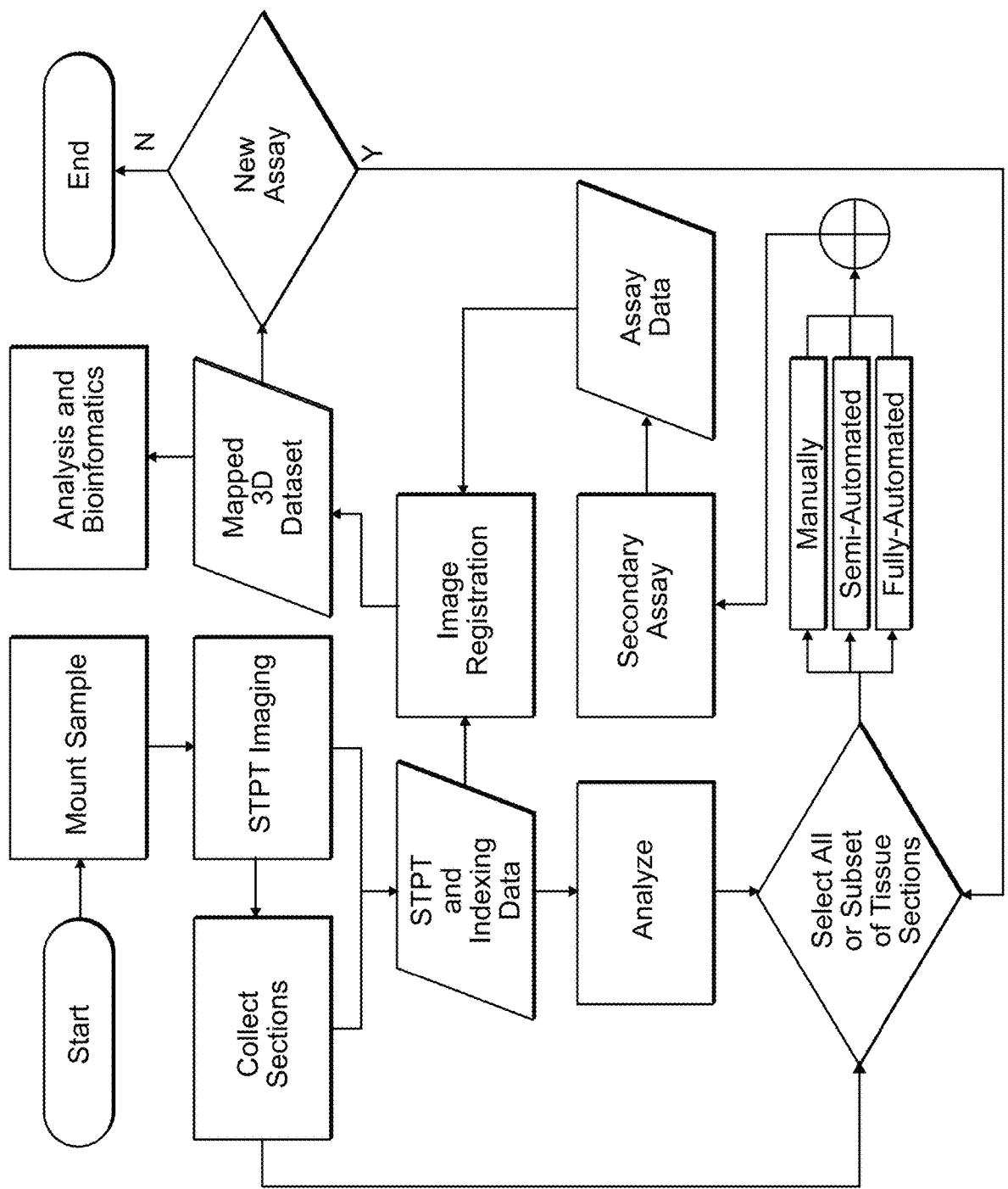
FIG. 11 illustrates a flow chart for a method of using the section capture system in conjunction with STPT and secondary assays to perform 3D mapping of histology data.
Figure 12:
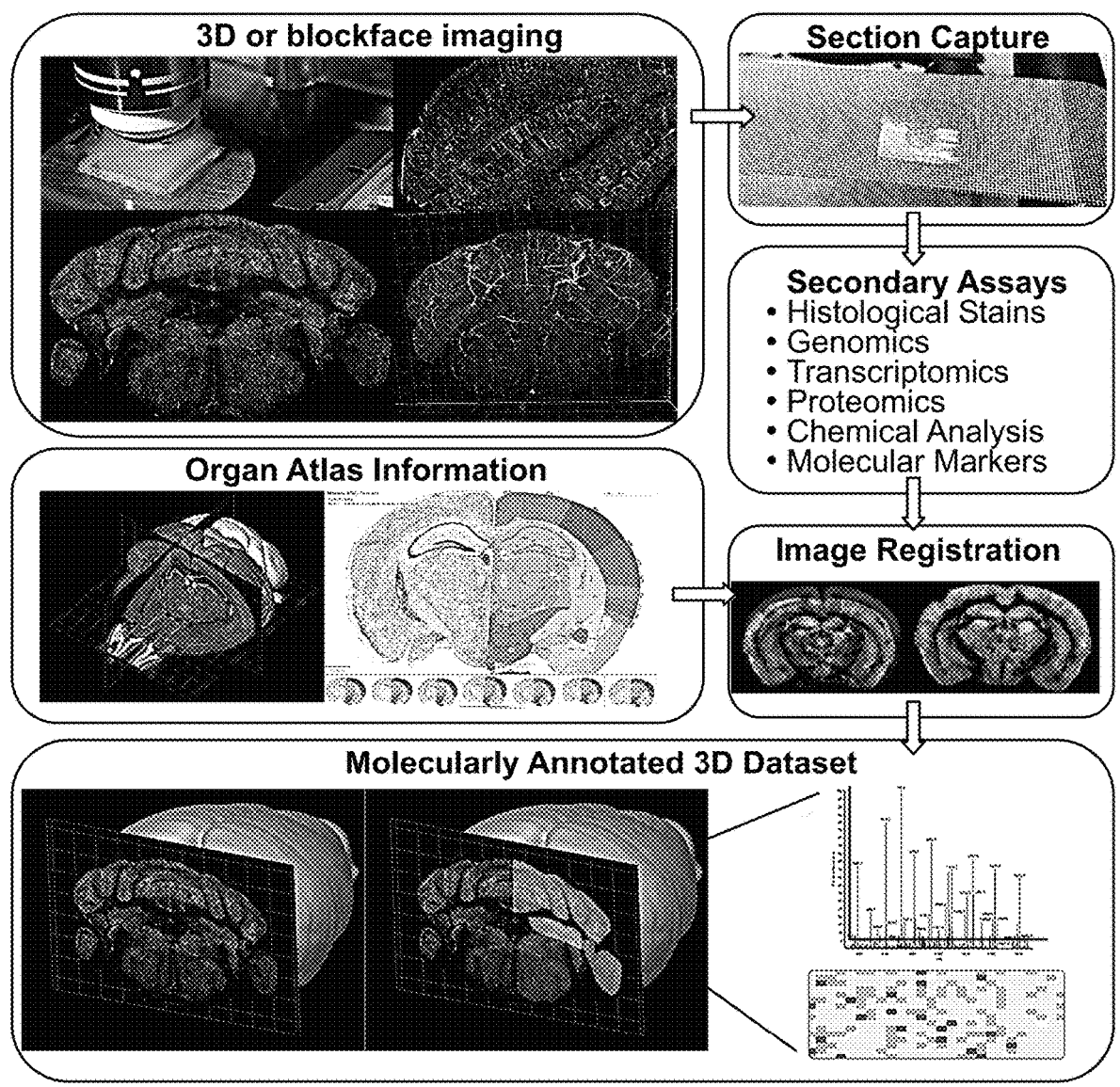
FIG. 12 depicts an automated 3D histology mapping. In this mapping, STPT is performed on a tissue sample. The tissue sections are captured from STPT and passed to secondary assays that may include staining, imaging, sequencing, or other molecular analysis. The STPT data is combined with the secondary assay data, as well as other reference information such as organ atlases and animal lineage, and the data is passed to image registration software. The software will map the multiplexed data streams to the high-resolution STPT template, resulting in a molecularly annotated 3D dataset.

This section capture technology is designed to work directly with STPT to capture tissue sections that are produced in the process of 3D tissue imaging. These sections can be used in secondary assays in order to map multiplexed biomolecular information, such as protein distributions, onto the subcellular 3D dataset produced by STPT. This 3D molecular mapping concept is depicted in the flow chart in FIG. 11 and the infographic in FIG. 12. A wide array of secondary assays can be performed on these tissue sections, including:

Histological staining
   Immunohistochemical staining
      DAB (3,3'-Diaminobenzidine) protocols
      Immunofluorescence (IF) protocols
      Isotope-labelled antibody staining for imaging mass cytometry (IMC) or multiplexed ion-beam imaging (MIBI)
   DAPI (4',6-diamidino-2-phenylindole)
   Hematoxylin and eosin (H&E)
   Nissl
   In situ hybridization (ISH)
      Fluorescence in situ hybridization (FISH)
Mass spectrometry
   Traditional
   Mass spectrometry imaging (IMS/MSI)
      IMC, MIBI
Genomics
   Next-Gen Sequencing (NGS) for DNA
Proteomics
Transcriptomics
   NGS for RNA
   Fluorescent in situ sequencing (FISSEQ)
Metabolic Assays
Target Engagement
Co-localization studies
Chemical and molecular analyses.
Electron microscopy
Spectrometry
Spectroscopy
Microdissection
Expansion microscopy
ISH
MerFish
smFish These assays can be semi- or fully-automated in conjunction with the output of the section capture and storage system. For example, well plates can be fed into automated liquid handling systems to perform free floating staining/labeling and rinses. Microscope slides can be used in automated staining systems, cover slippers, and slide scanning systems, for fully automated secondary labeling and imaging.

One of the more interesting applications of this molecular mapping technology is the ability to perform expansion microscopy on a specific region of tissue that is identified via STPT. A user can image an entire organ, identify a section of interest, and then infiltrate and embed the tissue in an expansion microscopy media and expand the tissue to image a region of interest in high resolution, for example to look at the dendritic spines of neurons.

As a standalone system, section capture and storage is valuable for any histology or pathology lab that works with tissue samples that require a vibrating blade microtome for sectioning. Manual sectioning and handling of tissue sections is a major source of human error and variability among laboratories, and this technology can assist to standardize section preparation with increased consistency and throughput, and provide a technological bridge to further automation of histopathology methods.

It is important that sectioning technology be used in conjunction with our section capture system to ensure the production of high-quality, intact sections, and to enable the consistent production of thinner sections which are desirable for many secondary assays. For example, thinner sections can be stained more rapidly, or used in imaging modalities that are incompatible with thick sections. There are several techniques to improve the quality of sections produced by the sectioning system.

The first technique involves double-embedding of the tissue sample as depicted in FIG. 13A. For vibrating blade microtome sectioning, typically tissue is embedded in a material that has similar viscoelastic properties in order to produce a more homogenous material for sectioning. This minimizes issues due to stiffness or damping mismatches that can cause differences in vibration amplitude, frequency, or phase between the tissue and embedding media. These mismatches can cause stress concentration at the interface between tissue and embedding media, and result in tissue detachment or tearing. However, stiffer embedding media is desirable because it tends to result in better sectioning. This proposed technique involves embedding a tissue sample first in one media 1302, and then embedding that block in a second, stiffer medium 1304 that can also be sectioned, for example a higher concentration agarose. This stiffer medium provides outer support to the sample block that helps to constrain the deflection of the sample block and improve section quality. In fracture mechanics, cracks propagate readily from stiffer to softer material, and so the interface between the sample block and outer media should not impede cut quality. At the trailing edge of the block, the additional material will also support the last portion of the cut to ensure it is severed cleanly from the block. Currently, thinner sections are sometimes not completely severed from the trailing edge and are left dangling where they can obstruct the objective and cause imaging issues. This is the same concept as drilling through a workpiece into a piece of scrap material, the scrap piece provides support at the tail end of the cut that prevents chipping and fraying and improves the cut quality.

Another method for production of thinner sections as depicted in FIG. 13B can be to add a support layer to the top of the sample block prior to sectioning. For example, if one wanted a 10 micron thick section, 40 microns of support material can be added to the top of the block and a 50 micron section could be taken. The support material can be removed after sectioning to leave only the 10 micron tissue section.

Another simple method to improve section quality is to increase the relative velocity of the sample transverse to the blade. Typical vibrating blade microtome cutting moves the sample into the blade at a constant normal velocity, while the blade vibrates in the transverse direction sinusoidally which applies shear. A good balance between the normal and transverse cutting velocity components is necessary for optimal sectioning Reyssat E, Tallinen T, Le Merrer M, Mahadevan L. Slicing Softly with Shear. Physical Review Letters. 2012; 109(24):244301, the contents of this publication being incorporated herein by reference. Because our transverse velocity component is sinusoidal, there are points along the velocity vs. time curve where the transverse velocity is momentarily near zero, which is undesirable for cut quality. One method to improve the transverse velocity component is to angle the blade relative to the direction of motion of the sample (FIG. 13C), which causes the motion of the sample block to have velocity components both normal and tangential to the blade. In addition, a user can move the sample relative to the blade (FIG. 13D) in such a manner as to introduce additional transverse velocity. For example, the sample can be driven into the blade at an angle, can be rotated, or can also move back and forth in a triangle or sinusoidal wave pattern, or any combination of these motions. These motions can be synchronized with the blade vibration for more robust cutting. One synchronization method includes having the sample mounted to a flexure and vibrate the sample in phase to the vibrating blade microtome. Another configuration would be to integrate a rotary stage, and rotate the sample into the blade as it also vibrates. Another configuration is to use a Compressotome as the sectioning device.

Figure 14A:
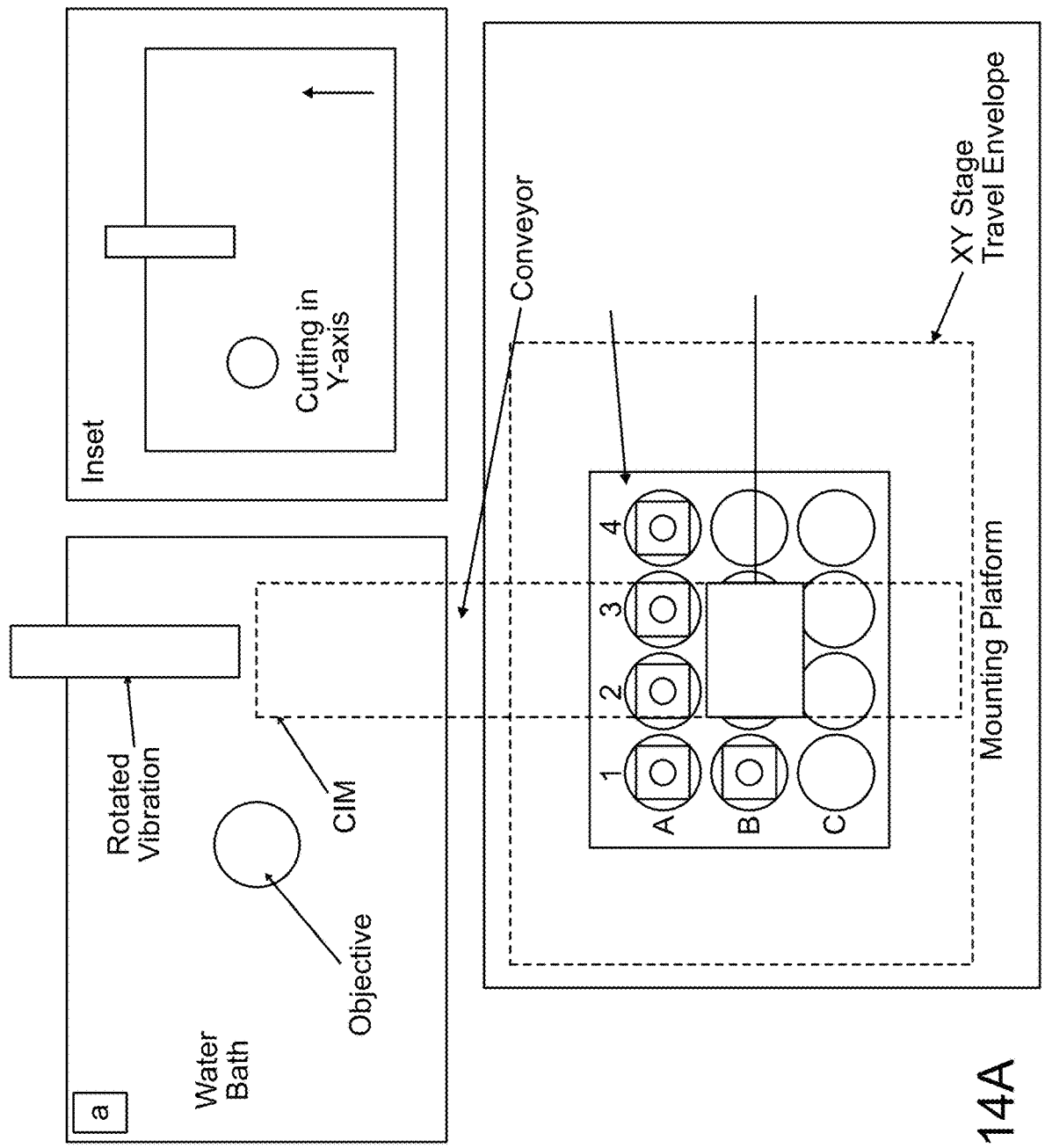
FIGS. 14A and 14B illustrate automated 3D histology mapping. STPT is performed on a tissue sample. The tissue sections are captured from STPT and passed to secondary assays that may include staining, imaging, sequencing, or other molecular analysis. The STPT data is combined with the secondary assay data, as well as other reference information such as organ atlases and animal lineage, and the data is passed to image registration software. The software will map the multiplexed data streams to the high-resolution STPT template, resulting in a molecularly annotated 3D dataset.
Figure 14B:
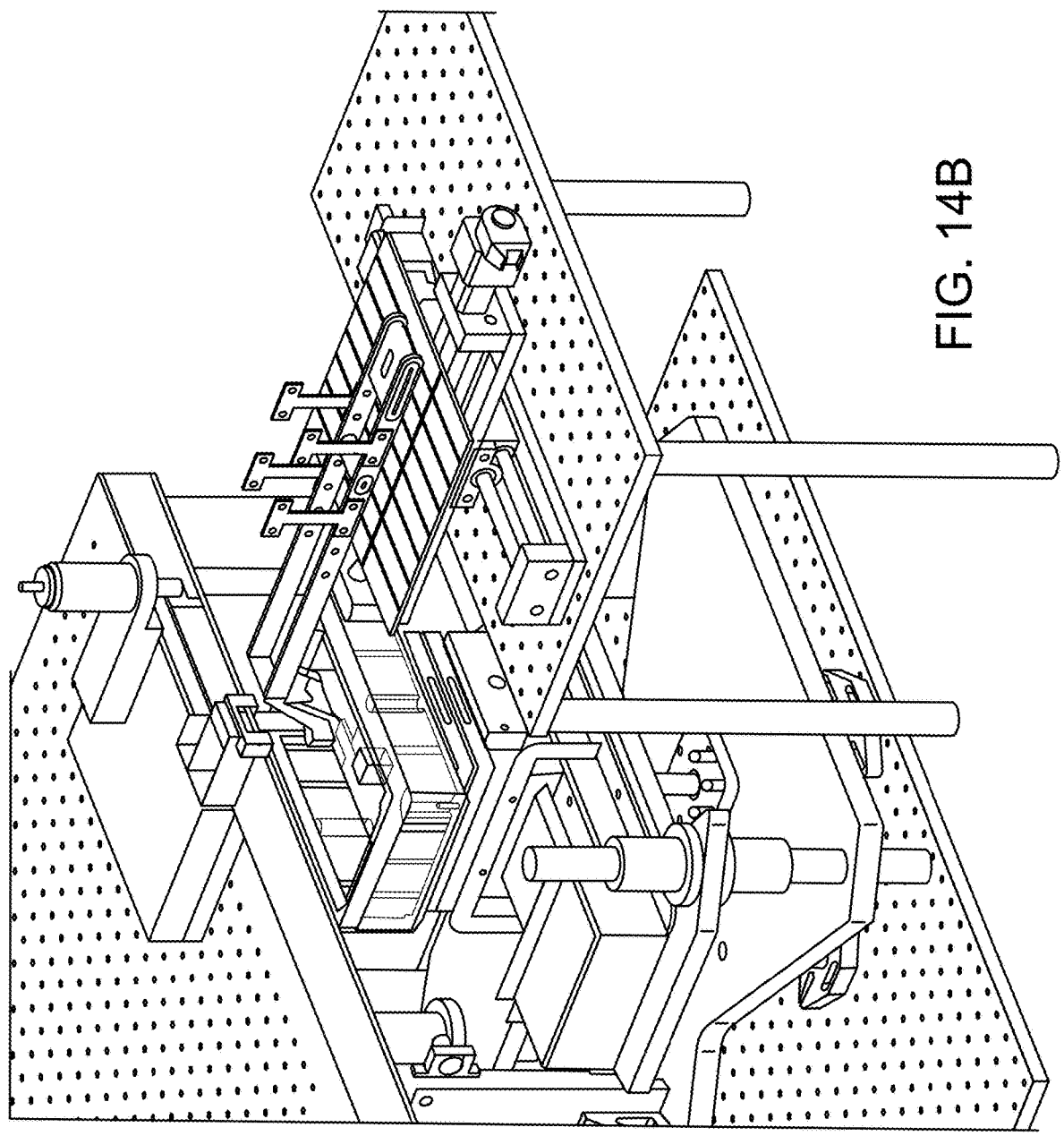

FIGS. 14A and 14B illustrate automated 3D histology mapping. STPT is performed on a tissue sample. The tissue sections are captured from STPT and passed to secondary assays that may include staining, imaging, sequencing, or other molecular analysis. The STPT data is combined with the secondary assay data, as well as other reference information such as organ atlases and animal lineage, and the data is passed to image registration software. The software will map the multiplexed data streams to the high-resolution STPT template, resulting in a molecularly annotated 3D dataset.

Figure 15:
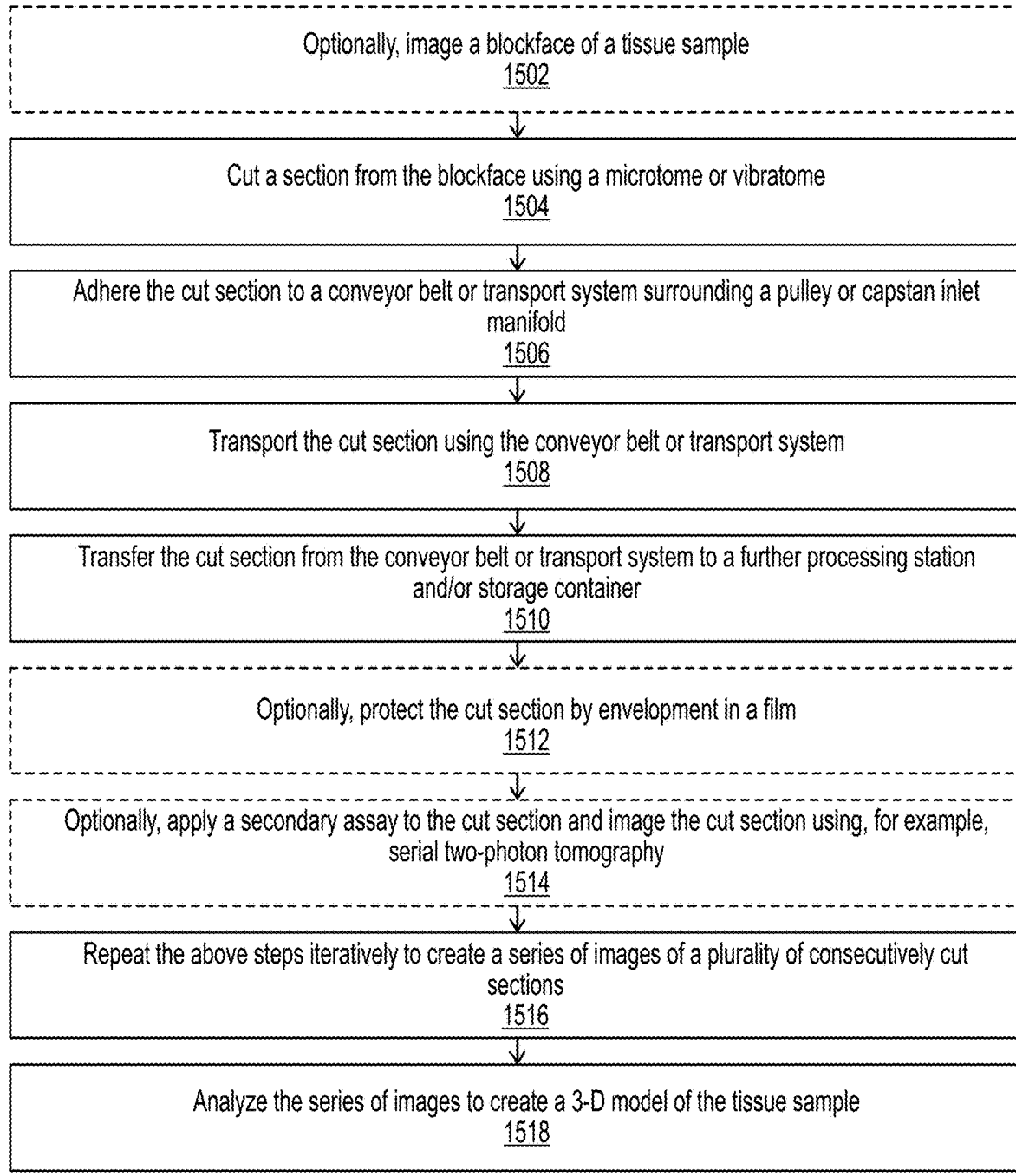
FIG. 15 depicts a method of automated imaging of slices of a tissue sample to produce a 3-D model of the tissue sample.

FIG. 15 depicts a method 1500 automated imaging of slices of a tissue sample to produce a 3-D model of the tissue sample. In some embodiments, the method can include an optional step 1502 of imaging a blockface of a tissue sample before sectioning begins. The method can include a step 1504 of cutting a section from the blockface using a vibrating blade microtome or microtome. In various embodiments, cutting the section using the vibrating blade microtome or microtome can be done as described above with reference to FIG. 2A. The method can include a step 1506 of adhering the cut section to a conveyor belt or transport system surrounding a pulley or capstan inlet manifold. The conveyor belt or transport system, pulley, and capstan inlet manifold can be substantially similar to those described above with reference to FIGS. 2B, 3A, 3B, and 7.

The method can include a step 1508 of transporting the cut section using the conveyor belt or transport system. The transporting of the cut section can be done as described above using the conveyor belt with reference to FIGS. 2B, 6, 9, and 10. The method can include a step 1510 of transferring the cut section from the conveyor belt or transport system to a further processing station and/or storage container. For example, the cut section can be transferred using a puff of gas as described with respect to FIGS. 6A-6D. In some embodiments, the cut section can be placed on a storage container such as a substrate, belt, film, or tape or in a well as described above with reference to FIGS. 8A-8C. In some embodiments, the cut section can be transferred to a further processing station such as the slide carousel or further imaging systems described with reference to FIGS. 4A-B, 5, 9A-B, and 10A-B.

The method can include an optional step 1512 of protecting the cut section by envelopment in a film. In some embodiments, the sections can be individually encapsulated as described above with reference to FIGS. 4 and 5. The method can include an optional step 1514 of applying a secondary assay to the cut section and imaging the cut section. In some embodiments, the imaging can be done using serial two-photon tomography or other multi-photon imaging techniques. The staining and imaging can be performed as described above with reference to FIGS. 5, 11, and 12.

The method can include a step 1516 of repeating the prior steps iteratively to create a series of images of a plurality of consecutive cut sections. Serial sectioning and transport of cut sections can be performed as described, for example, previously with reference to FIGS. 2-5. The method can include a step 1518 of analyzing the series of images to create a 3-D model of the tissue sample. The 3-D model can include morphographic tissue information as well as information determined from stains or secondary assays as described above with reference to FIG. 12.

Figure 16A:
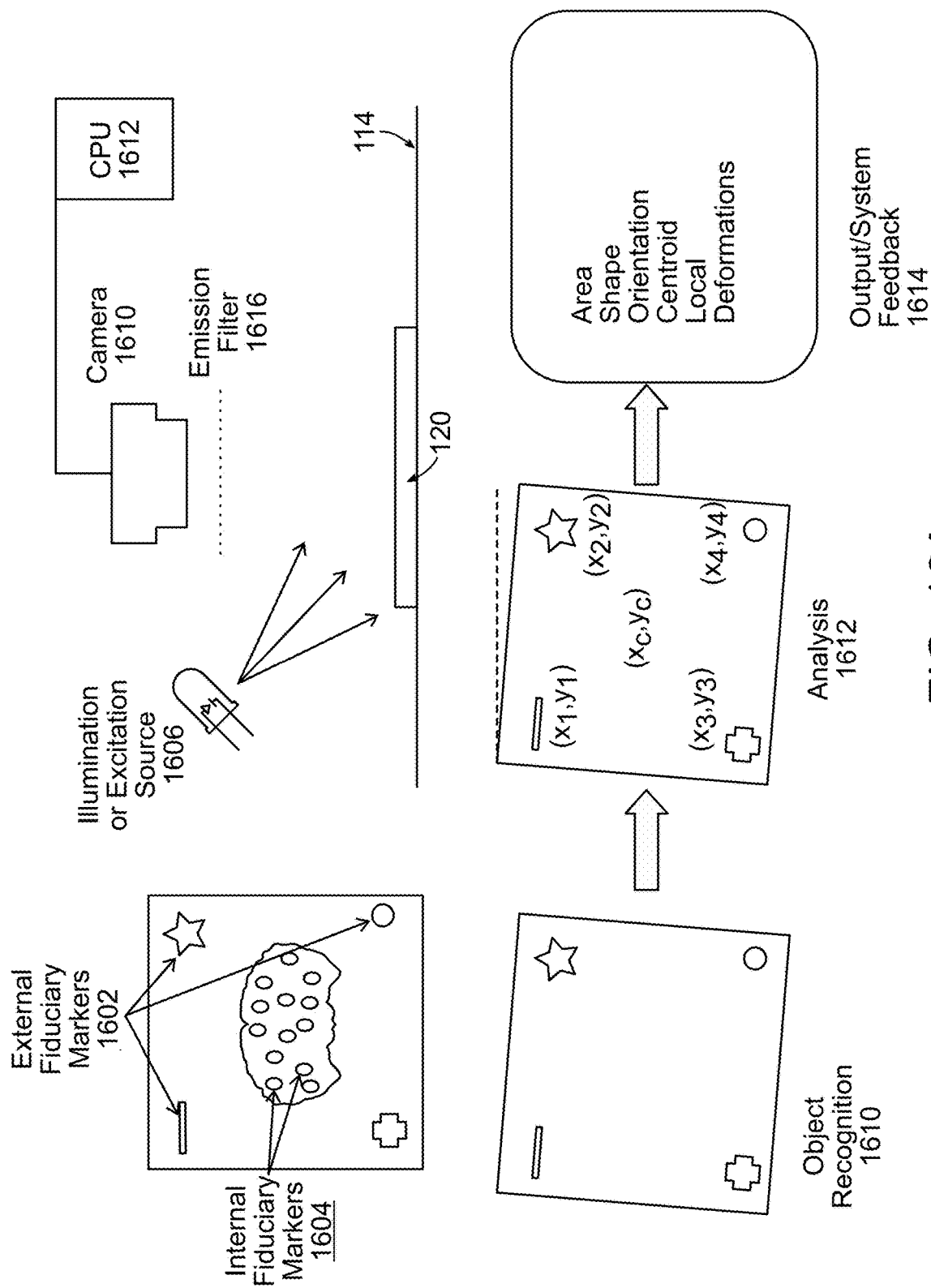
FIG. 16A illustrates the use of fiduciary markers to identify and analyze tissue sections in accordance with various embodiments described herein.

In some embodiments, the tissue section 120 can include external fiduciary markers 1602, internal fiduciary markers 1604, or a combination of both as shown in FIG. 16A. Fiduciary markers 1602, 1604 can enable the use of computer vision in some embodiments. Computer vision can be used to extract information about size, position, orientation, and conformation of the tissue section 120 which can aid in positioning the section and substrate for transfer, as well as feedback into the system as an indicator of section quality. It can also be used to image the tissue section 120 after it has been transferred to the substrate to identify its position, orientation, or conformation to feed into secondary processes/analyses such as secondary imaging and image registration. In some embodiments, the embedding media can be modified to improve contrast for purposes of computer vision, for example using agarose, acrylamide, or other hydrogel or polymer conjugated with a fluorophore or several different fluorophores. This can be present in the entire block or only in specific regions as an external fiduciary marker 1602. These regions can be made in distinct shapes in order to aid in the identification of the position, orientation, or conformation of the tissue section 120. An LED or other light source 1606 can be used to excite the fluorophore, and a camera 1610 with emission filter 1616 can be used to image the tissue section 120 on the belt 114 or after transfer to a substrate. From these images, thresholding and object recognition can be used to determine the size, position, shape, and orientation of the tissue section 120 on the conveyor belt 114 or substrate.

Identification of the location of fiduciary markers 1602, 1604 within the tissue section 120 can aid in determining whether the tissue section 120 is aligned with on the conveyor belt 114 and whether it is lying flat or in an otherwise desirable configuration. In some embodiments, the conveyor belt 114 can transport the tissue section 120 past an illumination or excitation source 1606. The illuminated tissue section 120 can then be imaged using a camera 1610 attached to a processing unit 1612. In some embodiments, an emission filter 1616 can be placed between the camera 1610 and the tissue section 120 to filter the light from the tissue section 120. In some embodiments, the processing unit 1612 can include an object recognition module 1610 to isolate and identify the fiduciary markers 1602, 1604 within the image acquired by the camera 1610. The processing unit 1612 can then apply an analysis module 1612 to the image to identify the positions of the fiduciary markers 1602, 1604 within the image. For example, a centroid can be computed for each fiduciary marker and assigned coordinates in an x-y plane. Each identified fiduciary marker 1602, 1604 can be assigned its own coordinates until the $c^{th}$ marker is assigned the coordinates $(x_c, y_c)$. The processing unit 1612 can also include an output or system feedback module 1614. The output or system feedback module 1614 can identify or compute characteristics for each imaged fiduciary marker 1602, 1604 including area, shape, orientation, centroid, and local deformations. The characteristics of the fiduciary markers 1614 can be analyzed to determine if the vibrating blade microtome 64 or the section capture system 100 need to be adjusted to return to normal operation. For example, if a threshold number of tissue sections 120 include deformed, missing, or incorrectly sized or shaped fiduciary markers 1602, 1604, adjustments may need to be made to the microtome or section capture system 100.

Tissue sections are thin, transparent, and wet, which can be difficult to sense against a mesh background. For a digital detection signal, there are several types of standard automation sensors that will work when properly tuned, including:

Diffuse photoelectric sensor
Capacitive proximity sensor
Luster sensor

Figure 16B:
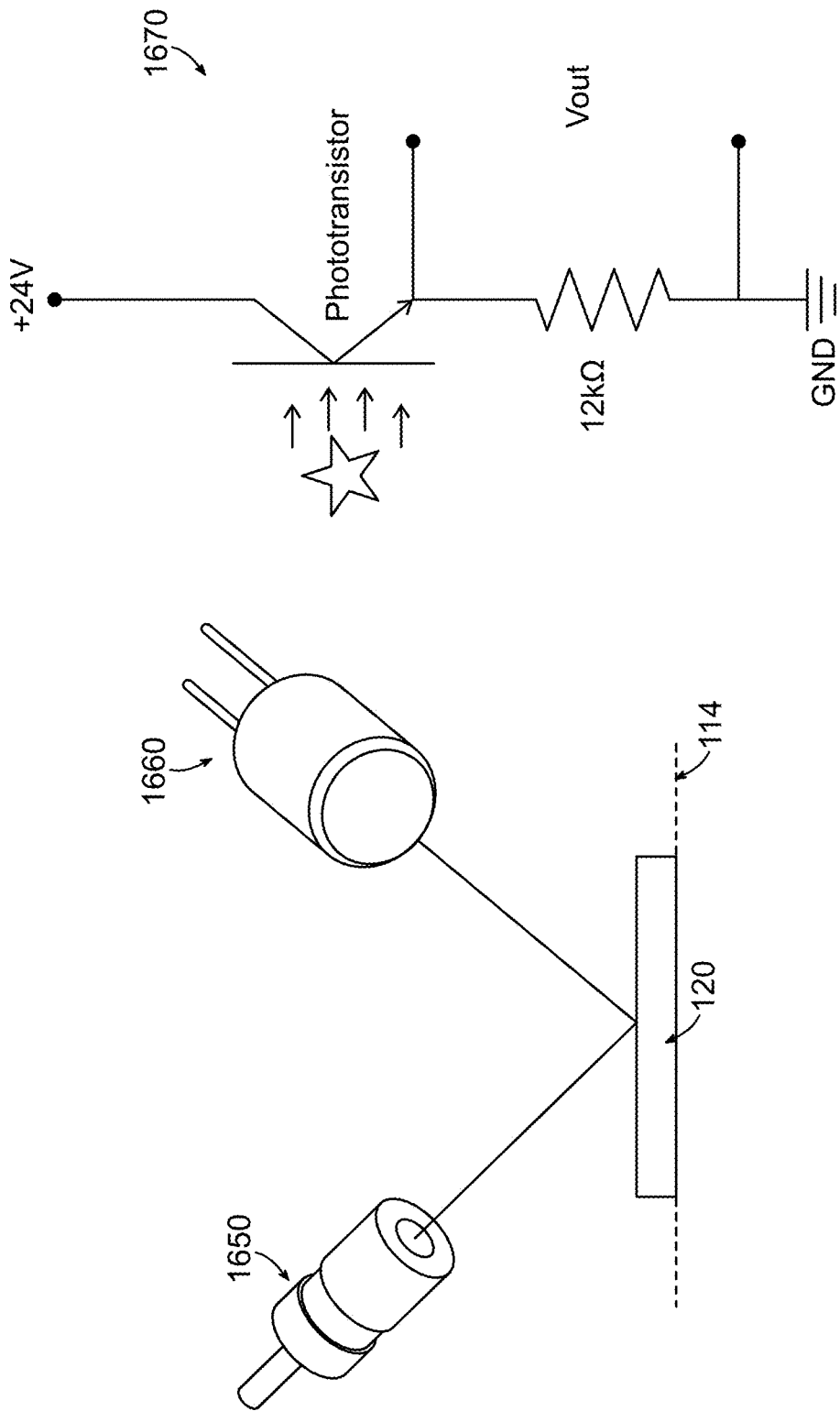
FIG. 16B illustrates a photoelectric sensor arrangement in accordance with various embodiments described herein.

Custom photoelectric sensors 1660 will also work and can be tuned to the specific application as shown in FIG. 16B. In particular, a shallow angle reflection of a laser diode 1650 onto a phototransistor 1660 output into a relay or comparator circuit 1670 can be used for detection of tissue sections 120, which will have more specular reflection than the mesh background.

To reduce the incidence of false positive sensor signals, the detection sensor 1660 can be "gated" such that the sensor status is only monitored when the tissue section 120 is in close proximity. An initial movement of the conveyor 114 can serve as coarse positioning, and the sensor edge-finding routine can serve as fine positioning to determine the exact location of the tissue section 120. Having multiple redundant sensors can also be used to reduce the incidence of false-positives in various embodiments.

Several steps can be taken to improve contrast of the tissue sections against the background, including the use of different mesh materials, different colors, and modifications to the embedding material as noted previously.

Computer vision can also be used to identify the position and orientation of tissue sections on the conveyor belt. In some embodiments, a camera can image the belt under specific illumination conditions, which may include diffuse light, dark-field, UV, IR, polarized, or low-angle light sources (or any combination thereof), with a variety of filters, such as standard band-pass emission or polarizing filters. Once the section is clearly illuminated with good contrast, thresholding and object recognition algorithms can be used to identify the section. Computer vision can be used as the sensor itself, to detect the presence and location of the tissue section 120, or it can be used in addition to a digital sensor to provide the system with additional information. For example, orientation data can be fed back into the system such that it can be corrected in the transfer process. Large deviations in orientation, size, or shape of the tissue section may also be used as an indication of the sectioning quality and may trigger errors in the system.

Figure 17:
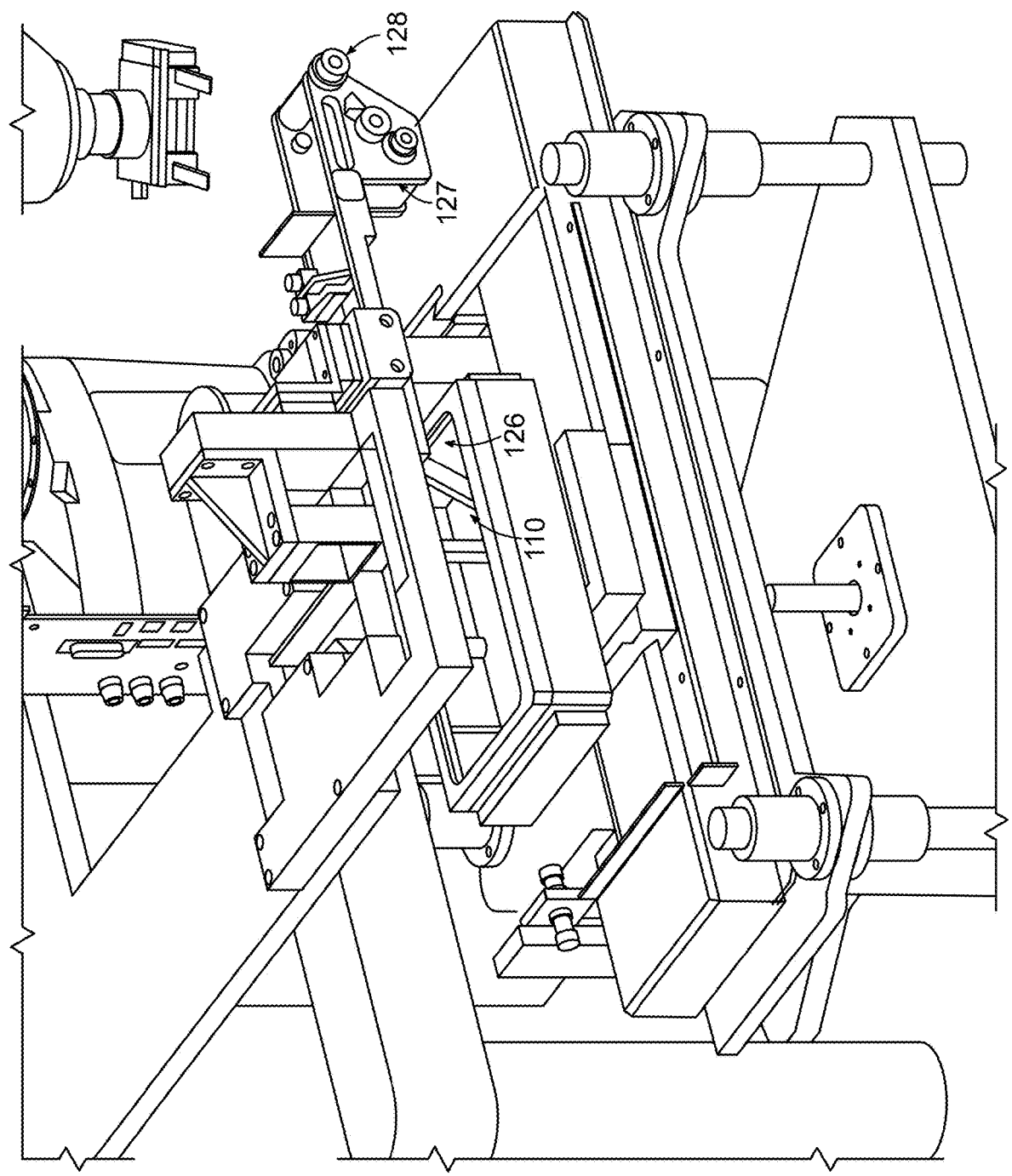
FIG. 17 illustrates a rendered view of a section capture system in accordance with various embodiments described herein.

FIG. 17 illustrates a rendered view of a section capture system in accordance with various embodiments described herein.

Figure 18A:
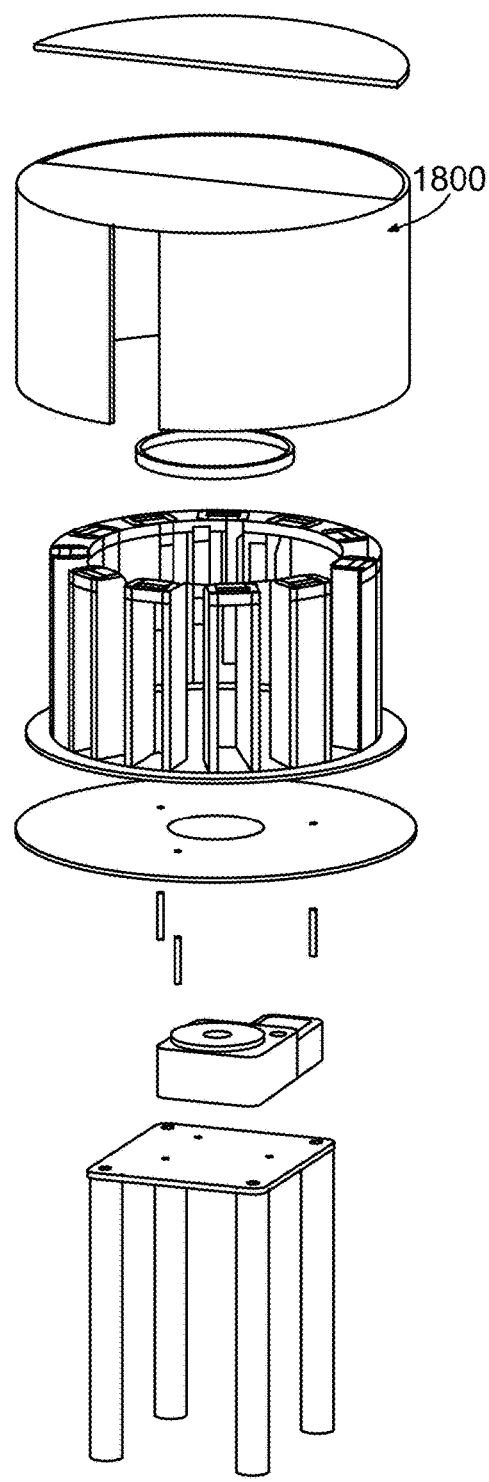
FIGS. 18A and 18B illustrate partially exploded views of a slide storage carousel in accordance with various embodiments described herein.
Figure 18B:
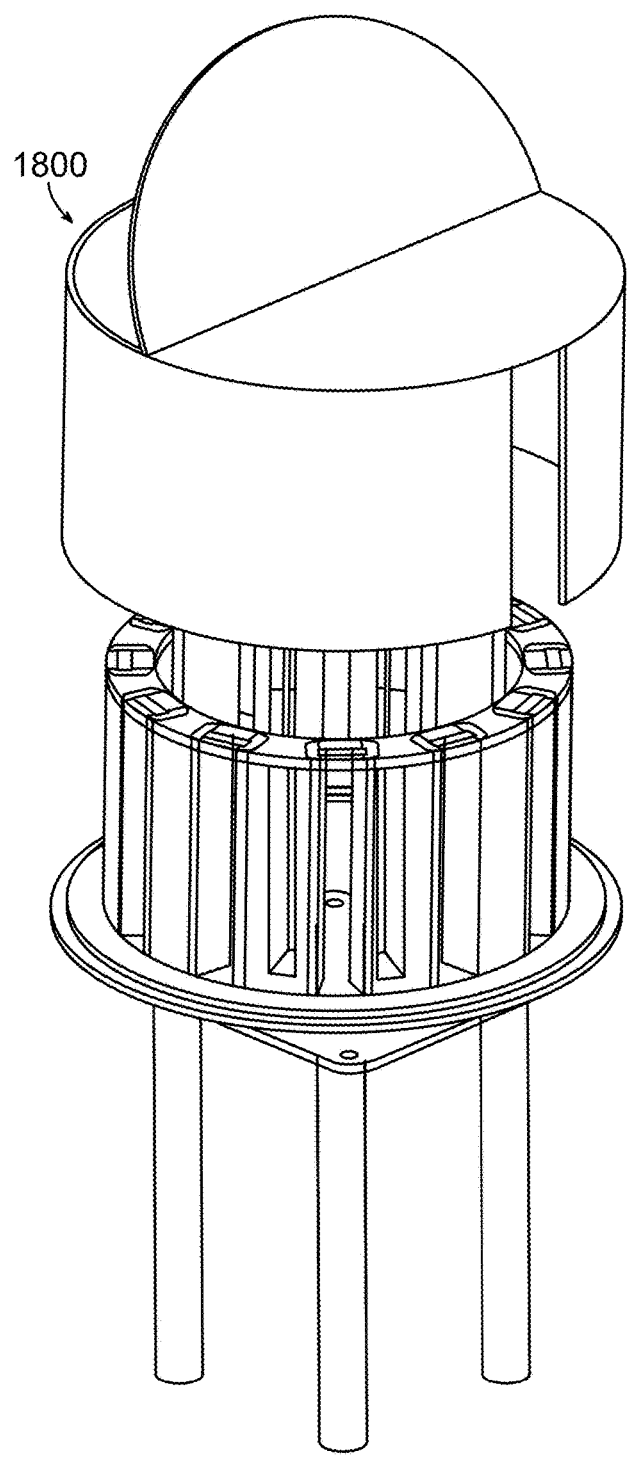

In various embodiments, a slide storage carousel 1800 can be used to store slides as depicted in FIGS. 18A and 18B. Slide handling and storage can accomplished using a 4-axis SCARA robotic arm, which is capable of moving an end effector in X, Y, Z Cartesian space with an additional axis for rotation about the Z-axis. The robot can have a force controlled electric gripper that allows for a specified amount of force to be used in grabbing slides, which is useful in cases where different size or shape slides are used. For example, the robot could handle cover slips by reducing the gripper force.

The gripper tooling is custom designed for handling microscope slides and consists of two slender fingers with grooves into which the sides of the microscope slides fit. These grooves are sized to the tolerances of typical slides (1.1 mm) and have radiused edges to guide the slide edges in without chipping or damage in case of slight misalignment. The grooves terminate at a specific distance along the length of the finger, to provide a hard stop for the end of the slides.

Slides can be stored in compact polyceramic racks that are compatible with commercial staining and coverslipping systems and are autoclavable and reusable. The racks can be oriented vertically with the slides stored flat. These racks can be stationary, or mounted to a rotary carousel, actuator, or stage to move them into the robot envelope or into a more desirable position for the robot to deposit slides, or for the user to access the racks. They can also be enclosed for humidification, using a sponge or active humidifier. FIGS. 18A and 18B depict an exemplary enclosed rotary slide storage carousel 1800.

To grab a slide from the rack, the robotic gripper can open wide and move into position a few millimeters from the target grab location on the slide. The gripper can then close until it is spaced just slightly wider than the slide, such that the slide rests within the grooves, but no gripping force is being applied. In some embodiments, this spacing can be on the order of ~1 mm. If the slide is misaligned, this initial motion serves the purpose of roughly aligning the slide. Next, the gripper can be moved to the target grab location on the slide. The tooling is closed enough such that if the slide is protruding too far from the rack, it will catch on the hard stop at the end of the groove and be pushed gently into position. Once in position, the gripper can be fully activated to apply a force to grip the slide, which will further force the slide into the grooves in case of any misalignment. This gripper motion and tooling design can allow the robot to compensate for any misalignment of the slide within its rack position. Once grabbed, the slide is moved into position for the tissue section to be transferred.

Once the section is transferred to the slide, the robot inserts the slide back into the rack, opens fully to release the slide, and then retracts. The gripper can have sufficient range to handle 25 mm or 50 mm glass slides. The gripper tooling can be slender enough to not interfere with adjacent slides in the racks, allowing for a good storage density that reduces the size and footprint of the storage system.

Slide rack positions can be taught to the robot using a defined local coordinate system such that only one point needs to be taught for each rack. A capacitive proximity sensor, inductive sensor, or photoelectric sensor can be integrated into the end effector and synchronized with the robot to provide semi-automated positioning feedback for the teach routine, or for use in detecting the presence or absence of a slide in the rack. The electric gripper can also provide feedback to indicate if it reached its target position and target gripper trigger force which can be used as an indication if a slide was grabbed or not.

The automated section capture and storage system includes several elements functioning in combination to controllably section and mount tissue sections onto flat substrates such as microscope slides. These elements include the following features shown generally in FIGS. 1-18.

1. A vibratome capable of serially sectioning embedded tissue to a controllable thickness, on the order of tens of microns.
2. An intake manifold connected to a circulating pump that applies an attractive fluidic force to the tissue section as it is being produced by the vibratome.
3. A porous substrate to which the tissue section is adhered via these fluidic forces, including fluidic drag within the water bath, and surface tension when a three-phase interface is formed outside of the bath.
4. A conveyor system to transport the tissue section out of the bath solution. The conveyor belt may serve as the porous substrate described in (3).
5. A sensor or camera to detect the presence and record the position of the tissue section.
6. A region of the conveyor belt where the section transfer takes place, consisting of:
    a. A cutaway in the conveyor's frame to allow direct access to the conveyor belt.
    b. Nozzles mounted to apply a gentle inert gas flow through the porous substrate and onto the tissue section to assist in detachment.
7. A substrate (microscope slide) handling and storage system comprised of
    a. A SCARA 4-axis robotic arm
    b. Electric gripper with force control
    c. Custom end-of-arm tooling
    d. Removable racks for storage and handling of the substrates
    e. Enclosure to allow for humidification of the substrates for several hours to days
8. A computer or PLC to program, control, and synchronize the system, including electronics and hardware, such as:
    a. Motion controllers
    b. Sensors
    c. Fieldbuses with analog and digital I/O
    d. Cables, terminal blocks, valves, switches, relays, safety hardware The system shown in FIG. 17 shows the transfer system that operates as illustrated in the following example which provides automated control for section processing operation:

1. User inputs all relevant operational parameters into a software GUI for system control, such as:
    a. Circulating pump flow rate (0-1000 ml/min, 350 ml/min typical)
    b. Conveyor speed (0-50 mm/s, 9.5 mm/s typical)
    c. Section thickness (10-1000 um, 50-100 um typical)
    d. Sectioning frequency (0-90 Hz, 50-80 Hz typical)
    e. Sectioning speed (0-20 mm/s, 0.5 mm/s typical)
    f. Sample length (0-45 mm, 22 mm typical)
    g. Conveyor positioning parameters (dependent on system setup)
    h. Number of sections (dependent on storage capacity, 240 typical)
    i. Gas pressure or flow parameters (typical 60 psi compressed air)
2. Sectioning system is initiated in software.
3. A robot grabs a substrate (microscope slide) from a storage rack and moves it into position in the transfer region of the conveyor belt.
4. The stage moves upwards by the desired thickness of the sample, the vibratome is activated at its target frequency, and the stage moves the sample into the blade at its specified sectioning speed to section a thin slice of tissue from the sample block.
5. The conveyor and circulating pump are activated during sectioning. The conveyor is porous, mildly hydrophilic, and biocompatible.
6. The tissue section is captured onto the conveyor belt, and at the end of the sectioning motion the pump and vibratome are deactivated, and the conveyor executes a step motion to bring the section into the region of the sensor.
7. The conveyor motion controller then uses an edge-finding routine with a sensor to search for and detect the edge of the tissue section.
8. Upon detecting the tissue section the conveyor executes a step motion to put the section precisely in the transfer region of the belt.
9. The robotic arm moves the substrate into direct contact with the tissue section where surface tension and gravity causes it to preferentially adhere to the hydrophilic substrate. The gas nozzles are then activated to discharge a controlled burst of gas onto the back side of the tissue section to aid in cleanly detaching it onto the substrate.

10. The substrate is lowered away from the belt and the gas nozzles are deactivated.
11. The substrate with the adhered tissue section is then returned to its storage rack.
12. The next slide in the sequence is grabbed and loaded into position for the next section. The stage is reset to its origin position and the sequence is repeated until the target number of sections is reached.

While this invention has been particularly shown and described with reference to preferred embodiments thereof, it will be understood by those skilled in the art that various equivalents thereof or changes in form and details can be made without departing from the scope of the invention encompasses by the appended claims.

The invention claimed is:

1. An automatic sample processing system comprising:
a sectioning tool to section, from a blockface of a tissue sample in a fluid bath, one or more tissue sections for processing;
a transport system to transport each tissue section separated from the tissue sample and removed from the fluid bath, the transport system including a tissue capture device that comprises a porous transport material and is further configured to provide a fluid flow within the fluid bath that directs a fluidic force at each tissue section such that each separated tissue section is received on the porous transport material that is actuated to move through the fluid bath and thereby removes each separated tissue section from the fluid bath;
a processing station that receives selected tissue sections transported from the fluid bath or from a storage system configured to store one or more tissue sections transported from the fluid bath;
an imaging device that images at least a portion of one or more tissue sections; and
a data processor that stores the images of the at least the imaged portion of each the one or more imaged tissue sections.

2. The system of claim 1, wherein the transport material is a conveyor belt that moves relative to a capstan inlet manifold through which fluid is drawn to apply the fluidic force to the separated tissue sections, the capstan inlet manifold having a cross-section that is one of cylindrical, wedge-type, or elongated.

3. The system of claim 1, wherein the processing station performs an assay that is applied to the one or more tissue sections after sectioning and before further imaging.

4. The system of claim 1, wherein the imaging device includes a serial two-photon tomography system, a two-photon microscopy imaging system, or an optical coherence tomography system.

5. The system of claim 1, further comprising a film enveloping system to envelope and protect each tissue section after sectioning using a film.

6. The system of claim 1, further comprising a gas source to direct a pulse of gas at each tissue section.

7. The system of claim 1, wherein the tissue capture device includes a fluid source to direct the fluid in the fluid bath at each tissue section after sectioning to direct the tissue section to the transport material.

8. The system of claim 1, further comprising an enveloping fluid that is applied to a surface of the tissue sample or a separated tissue section.

9. The system of claim 1, wherein a portion of the transport system is functionalized to enhance chemical bonding or electrostatic attraction and adhere each tissue section after sectioning to a portion of the transport system after removal from the fluid bath.

10. The system of claim 1, wherein the tissue sample is embedded in at least one of agar, agarose, or polyacrylamide, or hydrogel.

11. The system of claim 1, wherein the storage system further comprises at least one of one of a well, a container, a substrate, a belt, a tape, or a film.

12. The system of claim 1, wherein the data processor processes image data.

13. The system of claim 1, wherein the sectioning tool includes at least one of a vibrating blade microtome or a blade positioned relative to a gap between support arms wherein the sectioning tool, a pump controlling fluid flow rate and the transport system are connected to a processor programmed to control operation.

14. The system of claim 1, wherein the transport system includes a porous cylinder contacting the transport material.

15. The system of claim 1, further comprising an indexing system that stores the images of sections, that are each located in a recorded storage location, in a memory device.

16. The system of claim 1, wherein the transport system includes an intake manifold, and wherein the transport material comprises a belt, the belt contacting a porous member through which fluid is suctioned to apply the fluidic force to each separated tissue section, and wherein the system further comprises a light source to illuminate each tissue section on the belt for imaging.

17. An automatic sample processing system comprising:
a sectioning tool to section, from a tissue sample in a fluid bath, one or more tissue sections for processing;
a transport system to transport each tissue section separated from the tissue sample and removed from the fluid bath, the transport system including a tissue capture device that comprises a porous transport material and is further configured to provide a fluid flow within the fluid bath that directs a fluidic force at each tissue section such that each separated tissue section is received on the porous transport material that is actuated to move through the fluid bath and thereby removes each separated tissue section from the fluid bath;
a processing station that receives selected tissue sections from the fluid bath to characterize the selected tissue sections; and
a storage system configured to store one or more tissue sections transported from the fluid bath.

18. The system of claim 17, further comprising a robotic transfer system to move selected sections from the storage system to the processing station.

19. The system of claim 17, wherein the processing station is configured to perform an assay on a subset of the separated tissue sections.

20. The system of claim 17, wherein the assay comprises one or more of application of a histological stain for imaging, a genomics analysis, a transcriptomics analysis, a proteomics analysis, a merfish analysis, a chemical analysis, and application of molecular markers.

* * * * *